US007318124B2

(12) United States Patent
Hama et al.

(10) Patent No.: US 7,318,124 B2
(45) Date of Patent: Jan. 8, 2008

(54) CACHE HIT RATIO ESTIMATING APPARATUS, CACHE HIT RATIO ESTIMATING METHOD, PROGRAM, AND RECORDING MEDIUM

(75) Inventors: Toshiyuki Hama, Tokyo-to (JP); Ryo Hirade, Miura (JP)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/131,126

(22) Filed: May 17, 2005

(65) Prior Publication Data
US 2005/0268037 A1 Dec. 1, 2005

(30) Foreign Application Priority Data
May 27, 2004 (JP) ............................. 2004-157103

(51) Int. Cl.
*G06F 12/08* (2006.01)
*G06F 13/28* (2006.01)
(52) U.S. Cl. ....................................... 711/118; 711/158
(58) Field of Classification Search ...................... None
See application file for complete search history.

(56) References Cited

U.S. PATENT DOCUMENTS 6,493,810 B1 * 12/2002 Pang et al. .................. 711/170
2002/0147895 A1 * 10/2002 Glance et al. .............. 711/158

OTHER PUBLICATIONS

James Allen Fill and Lars Holsi, On The Distribution of Search Cost for Move to Front Rule, Random Structures and Algorithms, vol. 8, No.(1996).
Phillipe Flajolet, Daniele Gardy, Loys Thimoner, "Birthday Paradox, Coupon Collectord, Caching Algorithms and Self-Organizing Search," Discrete Applied Mathematics, 39 (1992), 207-229.
Predrag R. Jelenkovic, Asymptotic Approximation of the Move-to-Front Search Cost Distribution and Least Recently Used Caching Fault Probabilities, Annals of Applied Probability (1998).
P.J. Burville and J.F.C. Kingman, "On A Model For Storage and Search," J. Appl. Prob., 10, 697-701 (697-703).

* cited by examiner

*Primary Examiner*—Hyung Sough
*Assistant Examiner*—Duc T. Doan
(74) *Attorney, Agent, or Firm*—Richard M. Goldman

(57) ABSTRACT

Determining a cache hit ratio of a caching device analytically and precisely. There is provided a cache hit ratio estimating apparatus for estimating the cache hit ratio of a caching device, caching access target data accessed by a requesting device, including: an access request arrival frequency obtaining section for obtaining an average arrival frequency measured for access requests for each of the access target data; an access request arrival probability density function generating section for generating an access request arrival probability density function which is a probability density function of arrival time intervals of access requests for each of the access target data on the basis of the average arrival frequency of access requests for the access target data; and a cache hit ratio estimation function generating section for generating an estimation function for the cache hit ratio for each of the access target data on the basis of the access request arrival probability density function for the plurality of the access target data.

31 Claims, 10 Drawing Sheets

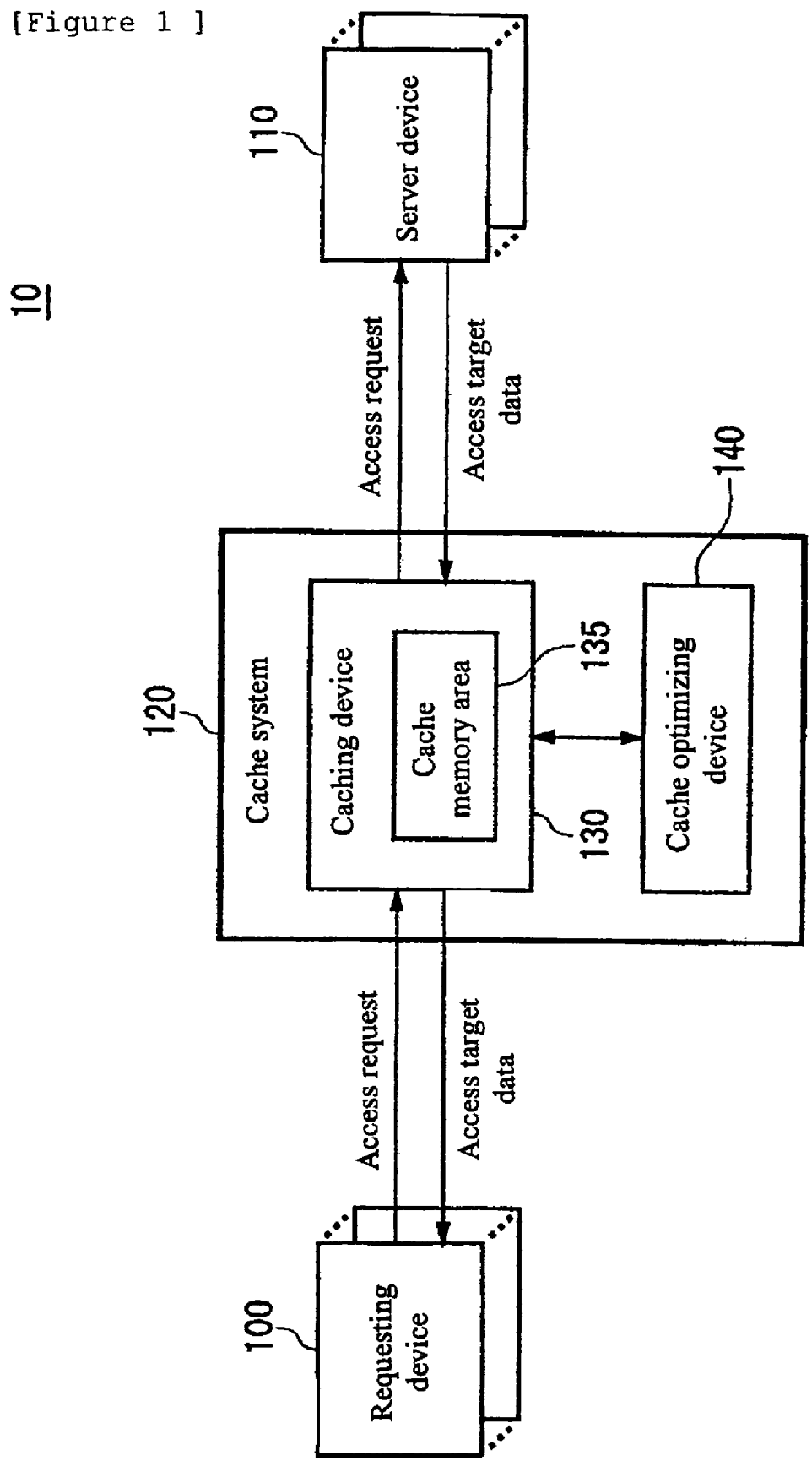

[Figure 2]
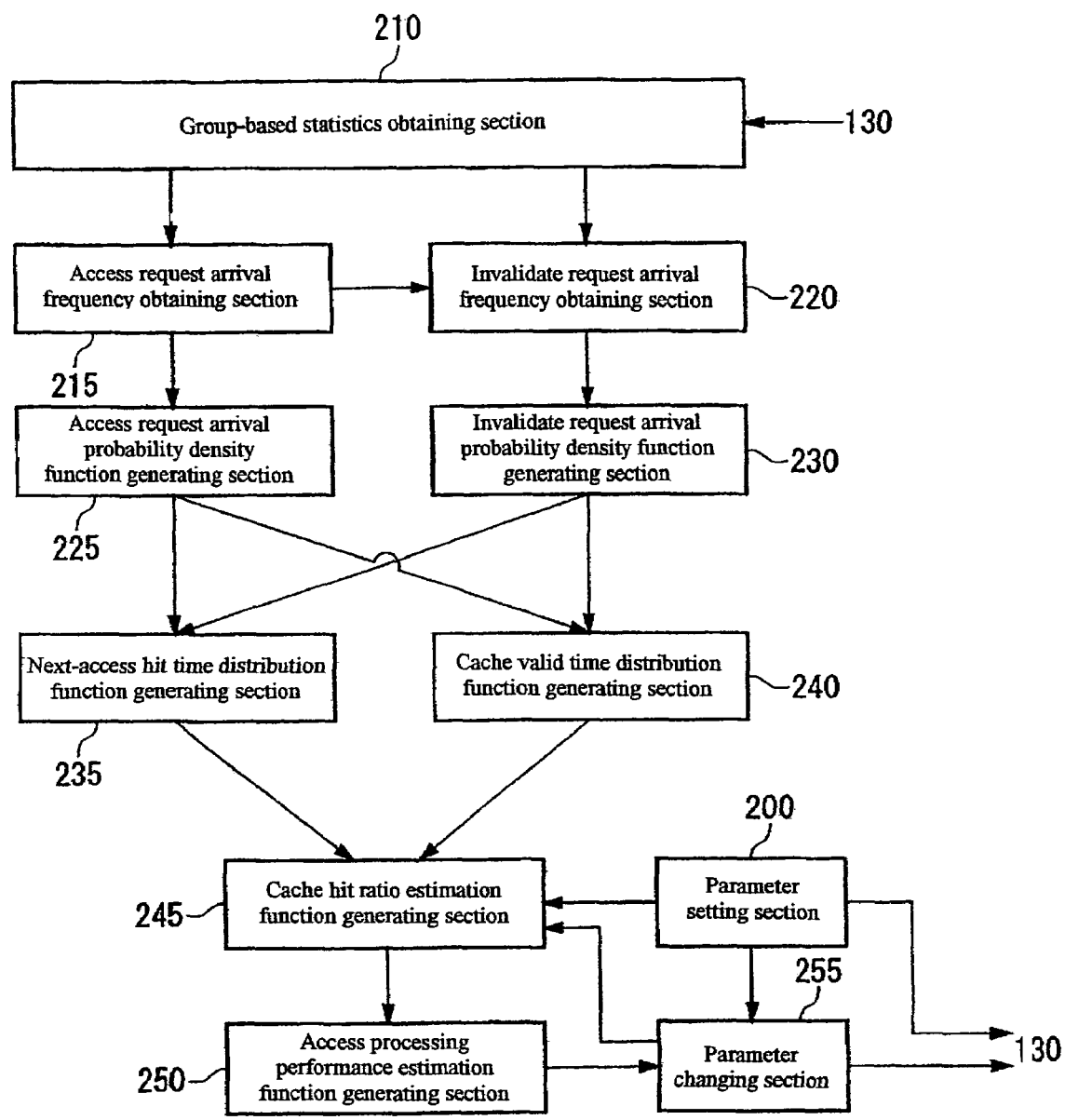

[Figure 3]
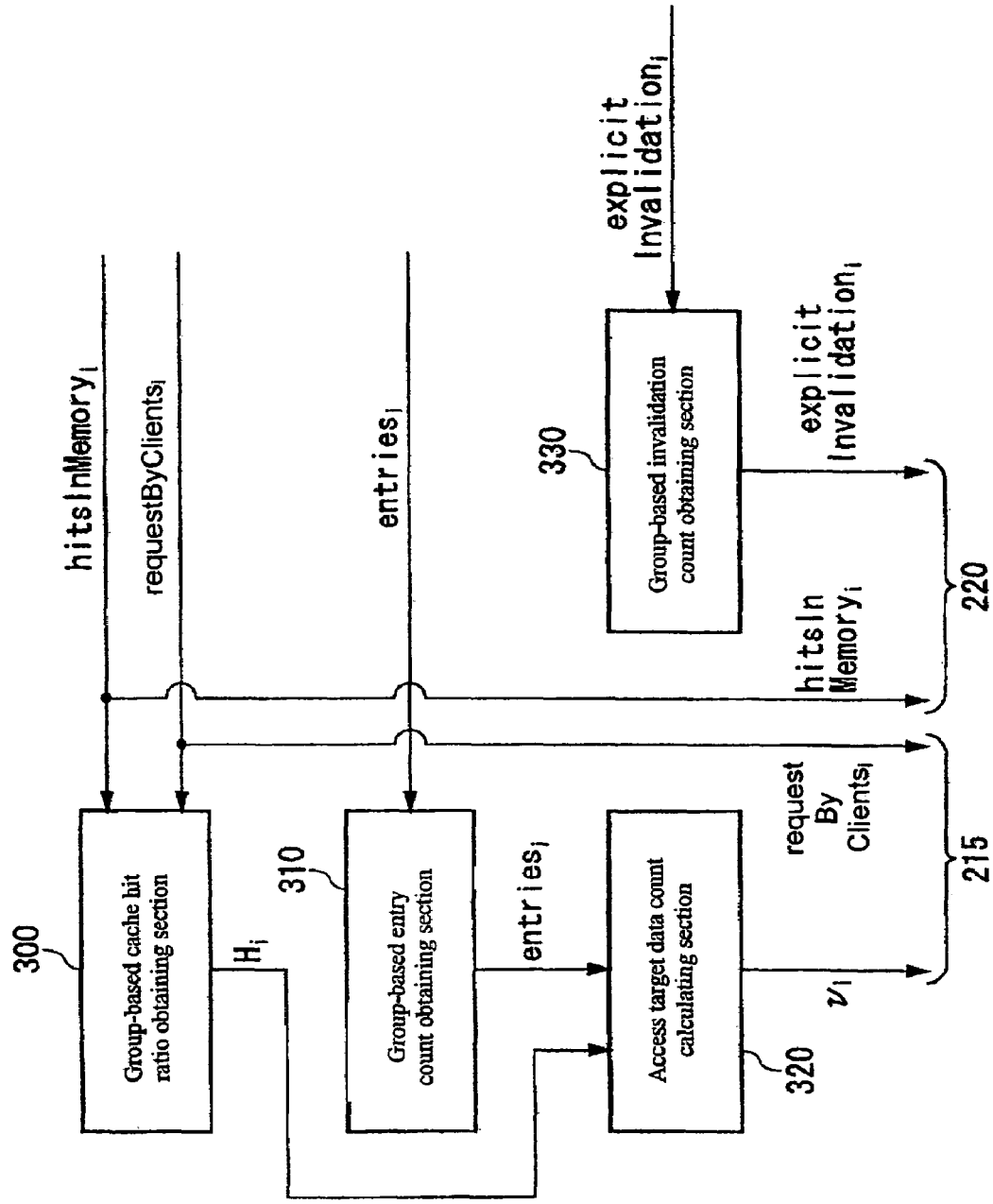

[Figure 4]
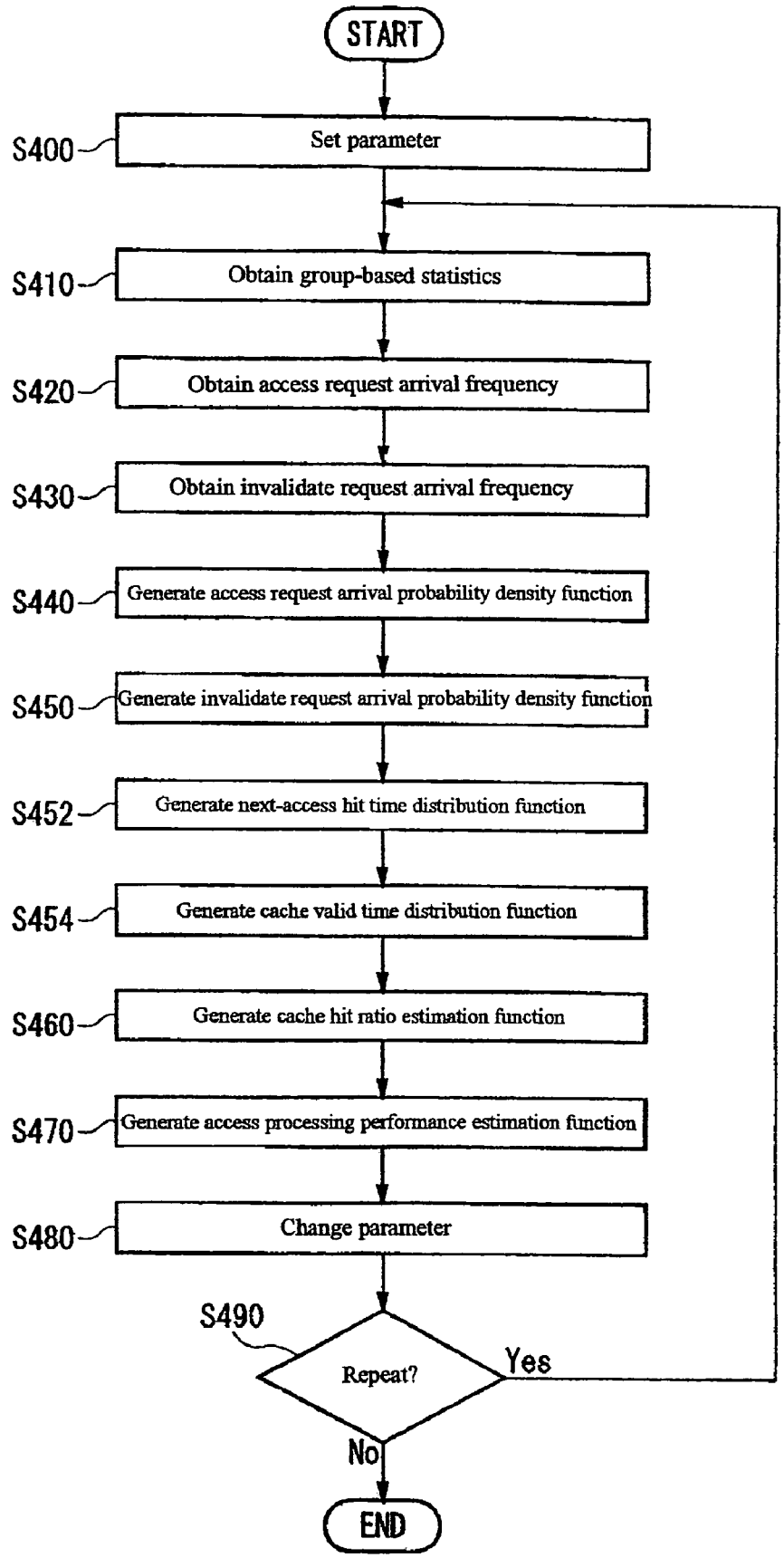

[Figure 5]
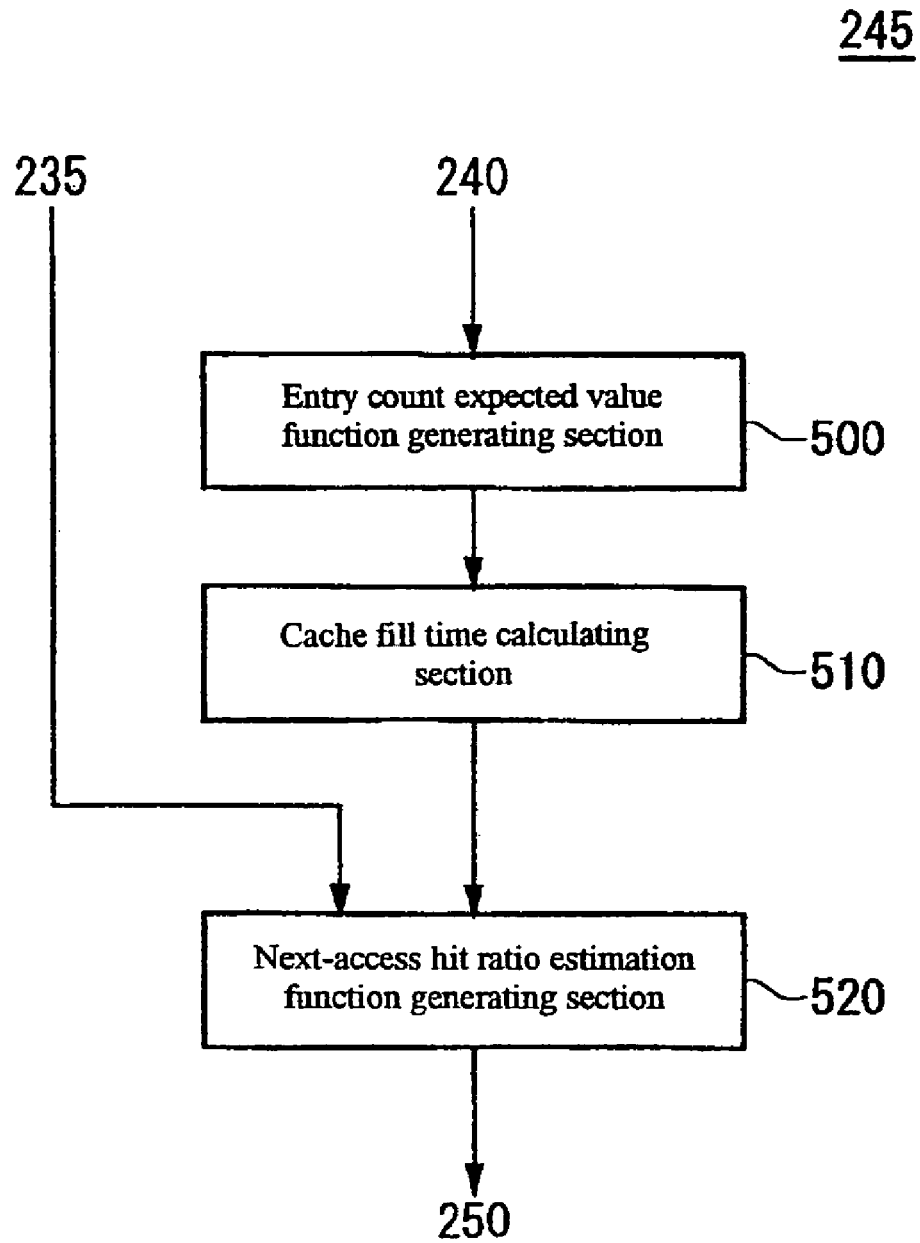

[Figure 6]
(a)
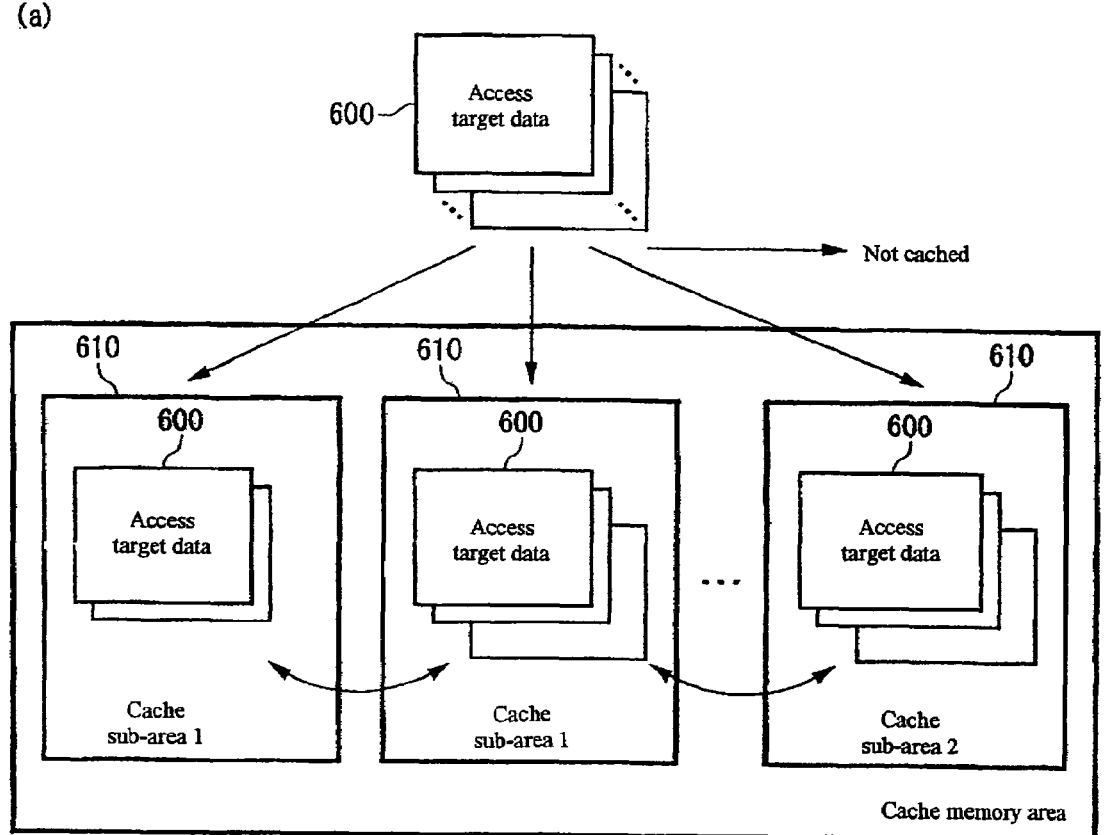
(b)
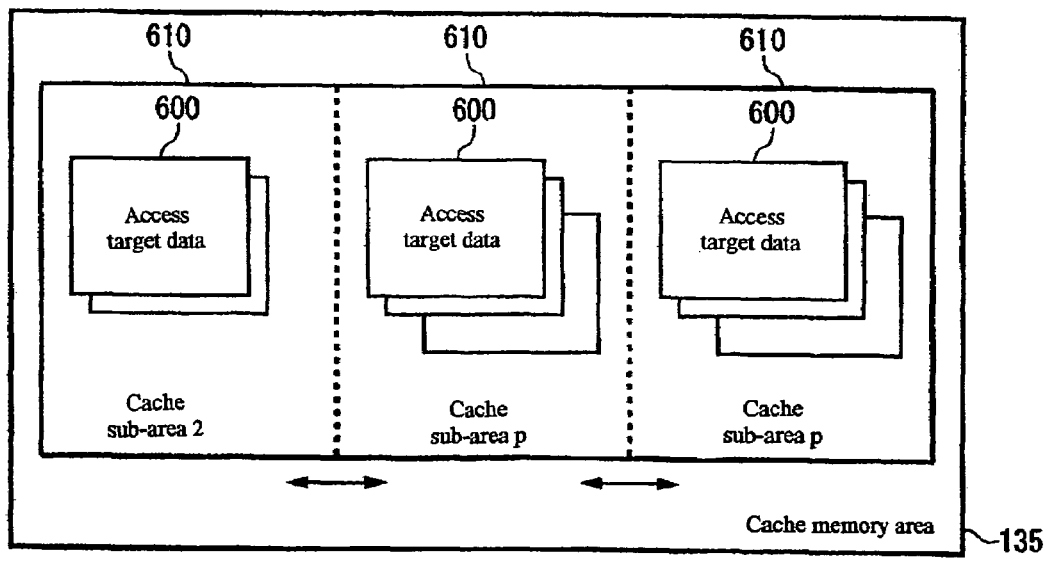

[Figure 7]
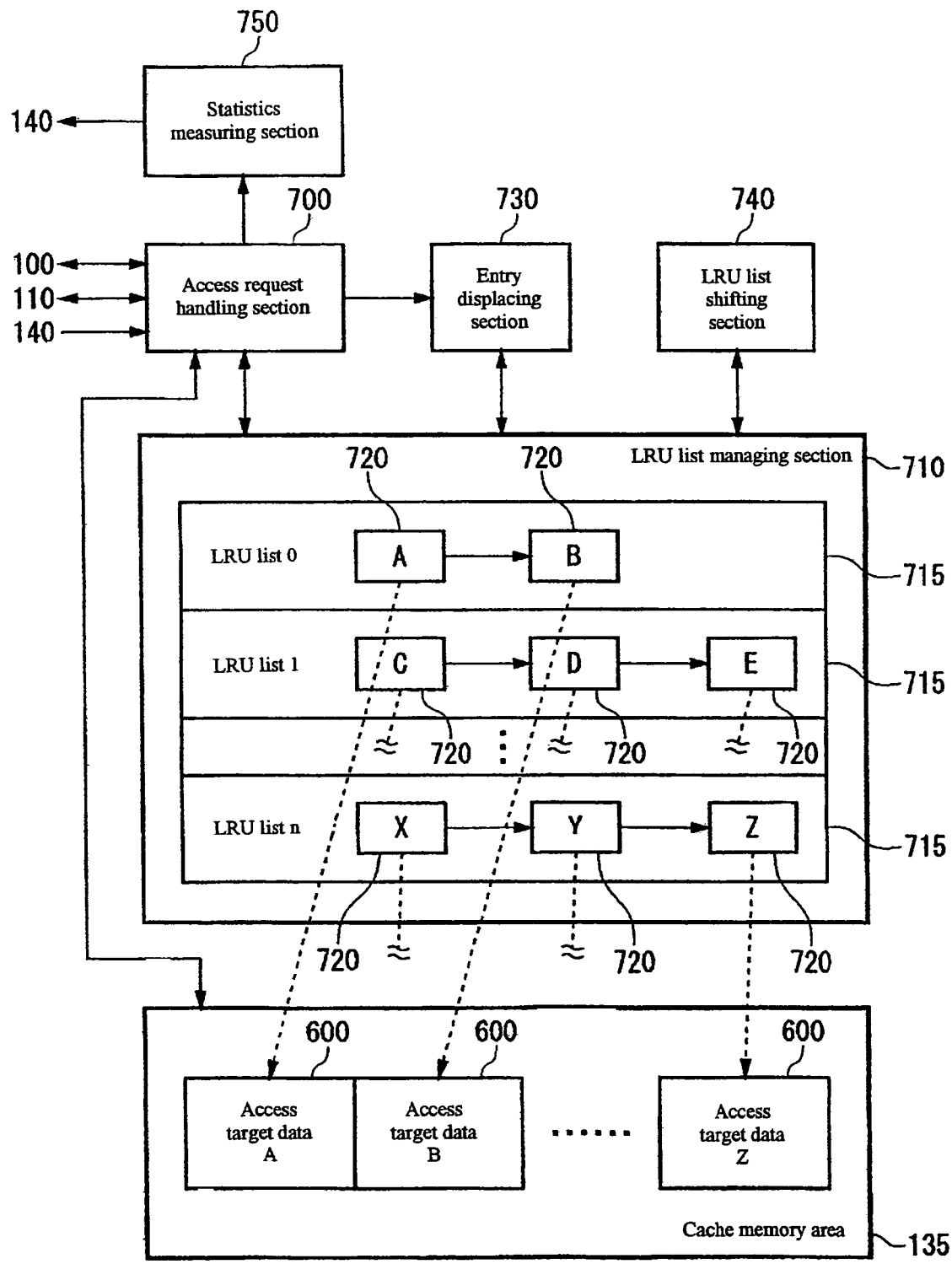

[Figure 8]
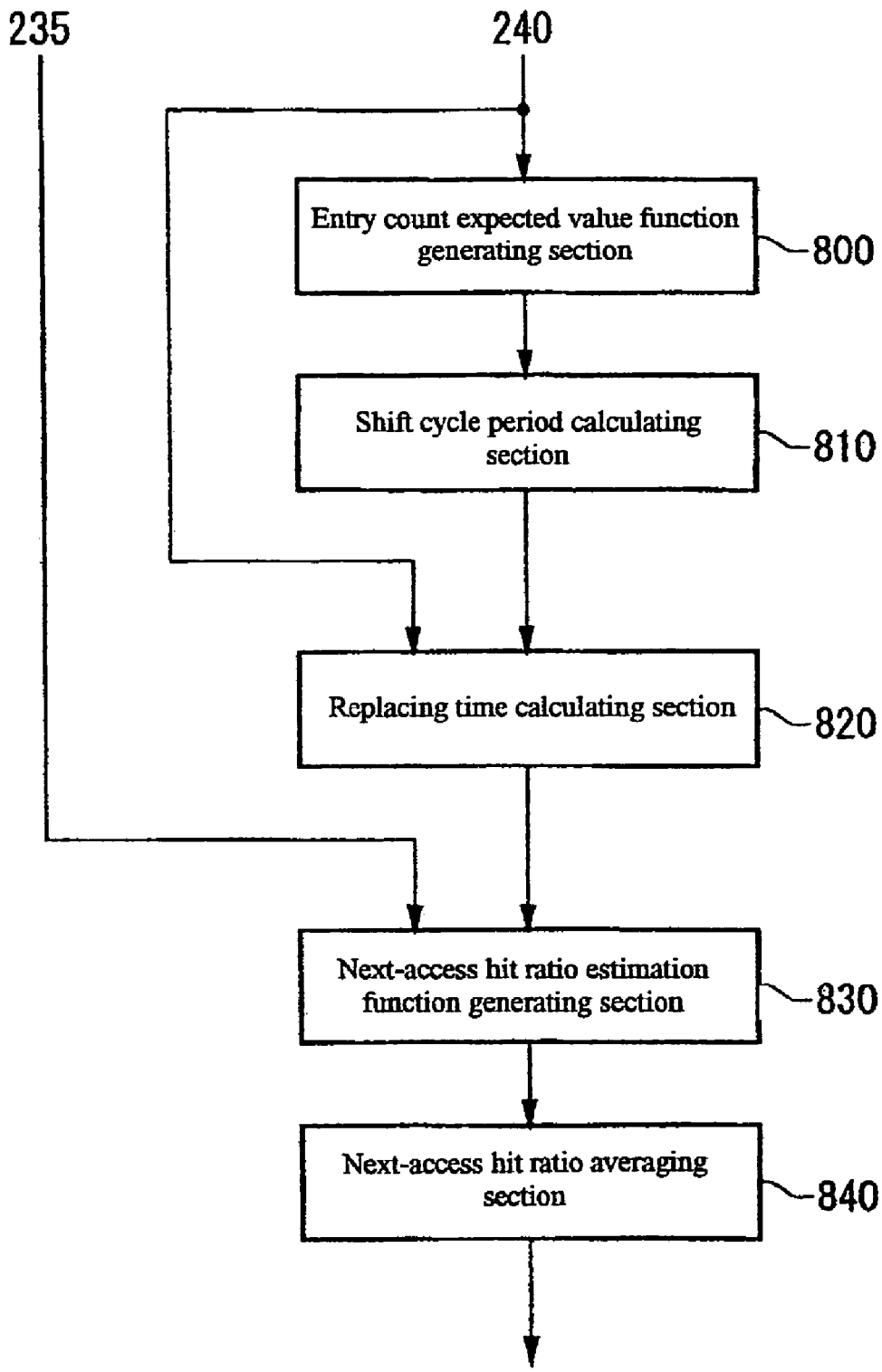

[Figure 9]
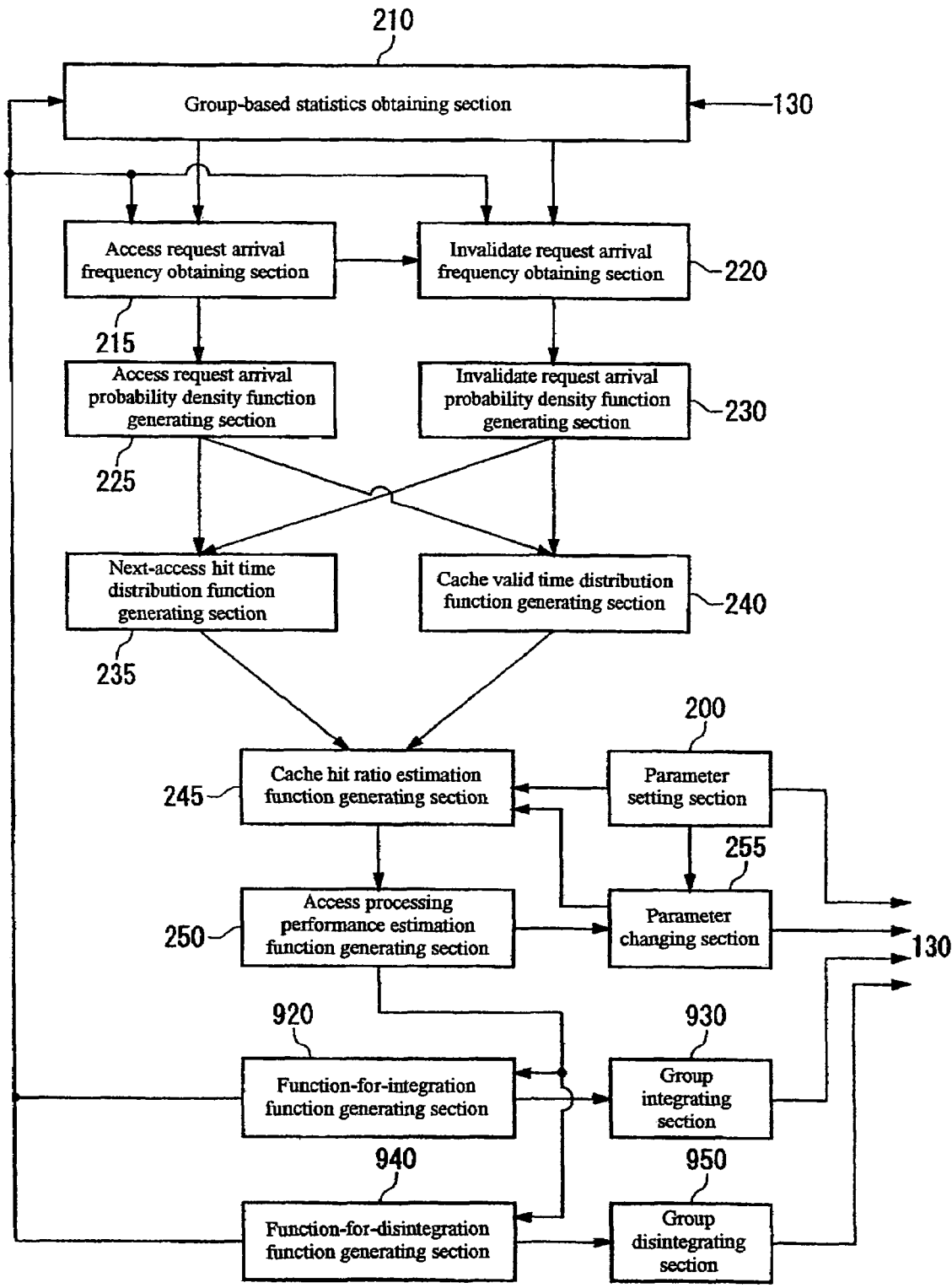

[Figure 10]
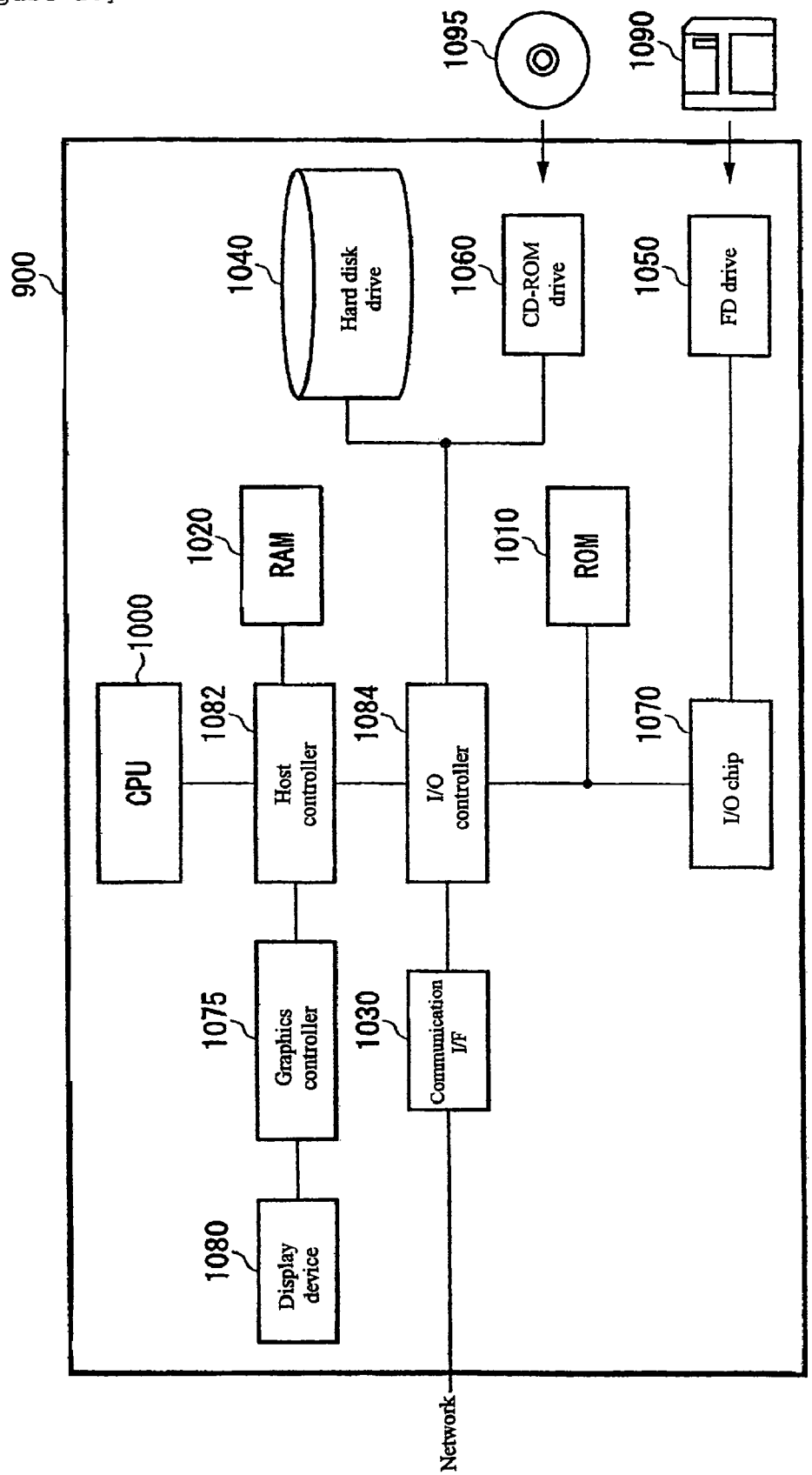

CACHE HIT RATIO ESTIMATING APPARATUS, CACHE HIT RATIO ESTIMATING METHOD, PROGRAM, AND RECORDING MEDIUM

BACKGROUND

1. Field of the Invention

The present invention relates to a cache hit ratio estimating system, a cache hit ratio estimating method, a program and a recording medium. More particularly, this invention relates to a cache hit ratio estimating system, a cache hit ratio estimating method, a program and a recording medium in which the cache hit ratio is estimated for a plurality of access object data that are different in the access cost at the time of cache miss.

2. Background Art

Server devices running Web applications today cache data accessed by components such as a HTTP server, Web container, EJB container, and database server, on a component-by-component basis, in order to reduce both workload and response time. The performance of an application that uses such caching is determined by the cache hit ratio for each of access target data, response time required when a cache hit occurs, and access processing time required when a cache miss occurs. However, because the impact of cache setting parameters on the cache hit ratio is not quantitatively obvious, the parameter has been set heuristically.

Approaches to estimating the hit ratio of caches based on LRU (Least Recently Used) have been proposed in non-patent documents 1 to 4.

The approach proposed in P. J. Burville and J. F. C. Kingman, "On a model for storage and search.", Journal of Applied Probability, 10: pp. 697-701, 1973 calculates the probability that an item to be cached is in the n-th position on an LRU list when an access request is received by using Equation (1).

[Equation 1]

$$P[C^N = n] = \sum_{r=1}^{N} \sum_{a=0}^{n-1} (-1)^{n-1-a} \binom{N-1-a}{n-1-a} \sum_{A:|A|=a, r \notin A} \frac{q_r^2}{(1-Q_A)} \quad (1)$$

where $Q_A \equiv \sum_{r \in A} q_r$ where $C^N$ represents the reference cost of all items (the position on the list of the items of access target data when access request is received) and $q_r$ represents the probability that item r (r=1, 2, ..., N) will be accessed.

Using Equation (1), the hit ratio of an LRU cache that caches k items can be calculated with $P[C^N \leq k]$.

The approaches in P. Flajolet, D. Gardy, and L. Thimonier, "Birthday paradox, coupon collector, caching algorithms and self-organizing search.", Discrete Applied mathematics, 39: pp. 207-229, 1992, and J. A. Fill and L. Holst, "On the distribution search cost for the move-to-front rule.", Random Structures and algorithms, 8(3): pp. 179-186, 1996 calculate the probability generating function of the reference cost $C_r^N$ of each item by using Equation (2).

[Equation 2]

$$E[z^{C^N}] = \sum_{i=1}^{N} q_i E[z^{C_i^N}] \quad (2)$$

-continued $$E[z^{C_r^N}] = \int_0^\infty q_r e^{-q_r t} \left[ \prod_{j \in [N]: j \neq r} \left( e^{-q_j t} + (1 - e^{-q_j t}) \right) \right] dt$$

P. R. Jelenkovic, "Asymptotic approximation of the move-to-front search cost distribution and least-recently-used caching fault probabilities.", Annals of Applied Probability, 9(2): pp. 430-464, 1999 shows the following Equations (3-1) and (3-2) as asymptotic approximate expressions for the case where the number N of items and the cache size k approach infinity. Equation (3-1) is an approximate expression for the case where the reference probability distribution of an item decreases in the multinomial (Heavy Tail) and Equation (3-2) is an approximate expression for the case where the reference probability distribution decreases exponentially (Light Tail). Furthermore, the document has demonstrated by experiment that the precision of the approximate expressions is high even if N and k are relatively small values.

[Equation 3]

$$\lim_{k \to \infty} \frac{P[C^\infty > k]}{P[R^\infty > k]} = \left(1 - \frac{1}{\alpha}\right)\left[\Gamma\left(1 - \frac{1}{\alpha}\right)\right] \quad (3\text{-}1)$$

if $P[R^\infty = n] \approx c/n^\alpha$ $$\lim_{k \to \infty} \frac{P[C^\infty > k]}{P[R^\infty > k]} = e^r \text{ if } P[R^\infty = n] \approx ce^{-\lambda n^\beta} \quad (3\text{-}2)$$

It is difficult to heuristically determine an optimum value of a cache setting parameter suitable for the execution environment of an application. For example, one method for calculating optimum values of setting parameters may be to change setting parameters while repeating performance measurements to obtain optimum setting parameters when building an information system. However, this method is burdensome and cannot keep up with a dynamically changing application execution environment.

Therefore, a need exists for a cache system in which more preferable setting parameters are calculated on the basis of various kinds of statistics measured during the runtime of an application and are set for a cache in order to improve the performance of the cache. In particular, a need exists for an estimation function for estimating the performance of access processing is generated on the basis of various statistics and setting parameters that increase estimations for access processing performance are calculated and set for the cache.

SUMMARY OF THE INVENTION

Therefore, the present invention proposes a cache system in which more preferable setting parameters are calculated on the basis of various kinds of statistics measured during the runtime of an application and are set for a cache in order to improve the performance of the cache. In particular, an estimation function for estimating the performance of access processing is generated on the basis of various statistics and setting parameters that increase estimations for access processing performance are calculated and set for the cache.

Data to be cached at a server device running Web applications is the data output from server applications and the access cost involved in a cache miss varies depending on the data accessed. Therefore, in order to estimate the performance of access processing precisely, the cache hit ratio for each of access target data must be calculated.

It is difficult to evaluate access processing performance efficiently by the approach in non-patent document 1 because the number of items A in Equation (1) explosively increases as the number of items increases.

Also, it is difficult to evaluate access processing performance using Equation (2) in non-patent documents 2 and 3 because the calculation becomes difficult mathematically as the number of items increases.

In non-patent document 4, the hit ratio for each individual item is not considered. However, in application execution environments to which the present invention will be applied, it is required that the cache hit ratio for each of access target data be obtained. Therefore, it is difficult to evaluate the access processing performance in such environments by using Equation (3).

Therefore, an object of the present invention is to provide a cache hit ratio estimating apparatus and a cache hit ratio estimating method, program, and recording medium that can solve the problems described above. The object is achieved by the combination of features set forth in the independent Claims. The dependent Claims define further advantageous specific embodiments.

According to a first aspect of the present invention, there are provided a cache hit ratio estimating apparatus and a cache hit ratio estimating method, program, and recording medium relating to the cache hit ratio estimating apparatus. The cache hit ratio estimating apparatus estimates the cache hit ratio of a caching device caching access target data accessed by a requesting device, wherein at least one of a plurality of access target data is different in the cache miss access cost from any of the other data of the plurality of access target data, and includes: an access request arrival frequency obtaining section for obtaining an average arrival frequency measured for access requests for each of the access target data; an access request arrival probability density function generating section for generating an access request arrival probability density function which is a probability density function of arrival time intervals of access requests for each of the access target data on the basis of the average arrival frequency of access requests for the access target data; and a cache hit ratio estimation function generating section for generating an estimation function for the cache hit ratio for each of the access target data on the basis of the access request arrival probability density function for the plurality of access target data.

The summary of the invention provided above does not enumerate all essential features of the present invention. Subcombinations of the features also can constitute the present invention.

With this invention, the cache hit ratio of the cache memory can be obtained analytically at high precision. And the access processing performance is enhanced by optimizing the setting parameters of the cache memory based on the analytical result.

BRIEF DESCRIPTION OF THE DRAWINGS

Various aspects and embodiments of our invention are illustrated in the Figures appended hereto.

FIG. 1 shows a configuration of an information system 10 according to an embodiment the present invention;

FIG. 2 shows a configuration of a cache optimizing device 140 according to the embodiment of the present invention;

FIG. 3 shows a configuration of a group-based statistics obtaining section 210 according to the embodiment of the present invention;

FIG. 4 shows an operation flow in the cache optimizing device 140 according to the embodiment of the present invention;

FIG. 5 shows a configuration of a cache hit ratio estimation function generating section 245 according to the embodiment of the present invention;

FIG. 6 illustrates an access processing performance optimizing method performed by the cache optimizing device 140 according to a first variation of the embodiment of the present invention, in which FIG. 6(a) illustrates access processing performance optimization by displacing access target data 600 and FIG. 6(b) illustrates access processing performance optimization by changing the size of a cache partition 610;

FIG. 7 shows a configuration of a caching device 130 according to a second variation of the embodiment of the present invention;

FIG. 8 shows a configuration of a cache hit ratio estimation function generating section 245 according to the second variation of the embodiment of the present invention;

FIG. 9 shows a configuration of a cache optimizing device 140 according to a third variation of the embodiment of the present invention; and FIG. 10 shows an exemplary hardware configuration of a computer 900 according to the embodiment of the present invention.

DETAILED DESCRIPTION OF THE INVENTION

The present invention will be described with respect to embodiments of the present invention. However, the embodiments are not intended to limit the present invention which is defined in the Claims and not all of the combinations of features described in the embodiments are essential to the inventive solution.

FIG. 1 shows a configuration of an information system 10 according to an embodiment of the present invention. The information system 10 includes one or more requesting devices 100, one or more server devices 110, and a cache system 120.

A requesting device 100 sends an access request to a server device 110 to request it to send data to access. The requesting device 100 receives target data from the server device 110. The requesting device 100 in the present embodiment may be a client terminal that sends access requests based on HTTP or SOAP to the server device 110. Alternatively, the requesting device 100 may be a CPU, for example, that accesses memory through a cache memory.

The server device 110 receives an access request by a requesting device 100 through a cache system 120, performs a process dependent on the access request, and generates the access target data. Then, the server device 110 returns the data accessed to the requesting device 100 through the cache system 120. The server device 110 in the present embodiment may be a Web application server, for example, which executes a servlet or a server program such as JSP addressing the access request to generate data for the access request. Alternatively, the server device 110 may be a memory system or an I/O system, for example, which accesses a memory area in response to an access request by a CPU or a requesting device 100. Each of the plurality of server devices 110 may be a JVM (Java® Virtual Machine) which processes an EJB container to which a subset of entity beans is assigned.

The cache system 120 has a caching device 130 and a cache optimizing device 140. The caching device 130 is accessed by a requesting device 100 and caches access target data, which is returned from a server device 110, in the cache memory area 135. When receiving an access request for accessing the cached access target data, the caching device returns the cached access target data from the cache memory area 135 to the requesting device 100. In the present embodiment, the caching device 130 caches up to K access target data by using the LRU policy.

The cache optimizing device 140, which is an example of a cache hit ratio estimating apparatus of the present invention, obtains measurements such as the frequency of access request arriving at the server device 110 from one or more requesting devices 100 and the frequency of invalidations of cached access target data during execution of process by the information system 10. Then, the cache optimizing device 140 estimates the cache hit ratio of the caching device 130 based on the measurements and generates an estimation function for the performance of access processing by the caching device 130 based on the estimation function of the cache hit ratio. It then calculates a setting parameter that improves the estimation value of the access processing performance and sets it in the caching device 130. In this way, the cache optimizing device 140 models the performance of the access processing by the caching device 130 based on the real environment and uses the model to set an optimum setting parameter in the caching device 130. Thus, the performance of access processing by the caching device 130 can be improved according to the real environment.

When receiving an access request, the one or more server devices 110 execute a server program responding to the access request for a certain period of processing time to generate access target data. The processing time between the reception of an access request and generation of access target data varies depending on server programs that address access requests and computers that implement the server device 110. The cache optimizing device 140 according to the present embodiment is intended to optimize the performance of access processing by the caching device 130 if the access cost for at least one of access target data, which represents the time required for the processing by the server device 110 when a cache miss occurs, differs from that for any of other data of a plurality of access target data.

FIG. 2 shows a configuration of the cache optimizing device 140 according to the present embodiment. The cache optimizing device 140 includes a parameter setting section 200, a group-based statistics obtaining section 210, an access request arrival frequency obtaining section 215, an invalidate request arrival frequency obtaining section 220, an access request arrival probability density function generating section 225, an invalidate request arrival probability density function generating section 230, a next-access hit time distribution function generating section 235, a cache valid time distribution function generating section 240, a cache hit ratio estimation function generating section 245, an access processing performance estimation function generating section 250, and a parameter changing section 255.

The parameter setting section 200 sets the initial value of a setting parameter for the cache in the caching device 130. The parameter set by the parameter setting section 200 is a parameter that affects the access processing performance for access requests by a requesting device 100.

The group-based statistics obtaining section 210 obtains statistics measured by the caching device 130 for access requests and/or access responses. In the present embodiment, each of access target data cached by the caching device 130 belongs to any of a number of groups based on access costs. For example, access target data generated by the server device 110 in response to an access request may be grouped by server program that generates the access target data, that is, by type of servlet, command, or Web service, for example. Multiple access target data generated in response to a number of access requests to different server programs belong to different groups. On the other hand, multiple access target data generated when access requests with different input parameters are sent to the same server program belong to the same group. One specific example of the latter case is the case where a number of users with different user IDs access the same server program.

In the present embodiment, the group-based statistics obtaining section 210 obtains statistics measured by the caching device 130 for each access request and each group of access target data.

The access request arrival frequency obtaining section 215 obtains the average arrival frequency $\lambda_i$ measured for an access request for each of access target data on the basis of statistics obtained by the group-based statistics obtaining section 210. The invalidate request arrival frequency obtaining section 220 obtains the average arrival frequency $\mu_i$ measured for invalidate requests for each of access target data on the basis of statistics obtained by the group-based statistics obtaining section 210 and the average arrival frequency $\lambda_i$.

The access request arrival probability density function generating section 225 generates the access request arrival probability density function $f_i^R(t)$, which is the probability density function of the time intervals of arrival of access requests to an access target data, on the basis of the average arrival frequency $\lambda_i$ of access requests for the access target data. The invalidate request arrival probability density function generating section 230 generates the invalidate request arrival probability density function $f_i^I(t)$, which is the probability density function of time intervals of arrival of invalidate requests for each of access target data on the basis of the average arrival frequency $\mu_i$ of invalidate requests for the access target data.

The next-access hit time distribution function generating section 235 generates the next-access hit time distribution function $F_i(t)$ for each of access target data on the basis of the access request arrival probability density function $f_i^R(t)$ and the invalidate request arrival probability density function $f_i^I(t)$. In the present embodiment, the next-access hit time distribution function is the time distribution function of the probability that an access request for an access target data will be received after an access request for the access target data is received but before the access target data is invalidated in the cache.

The cache valid time distribution function generating section 240 generates the cache valid time distribution function $G_i(t)$, for each of access target data on the basis of the access request arrival probability density function $f_i^R(t)$ and the invalidate request arrival probability density function $f_i^I(t)$. In the present embodiment, the cache valid time distribution function $G_i(t)$ is the time distribution function of the probability that at least one access request for the access target data will be received and the access target data will not have been invalidated in the cache with respect to a predetermined base point of time, that is, a given point of time, for example.

The cache hit ratio estimation function generating section 245 generates the cache hit estimation function $h_i$ for each of access target data on the basis of the access request arrival probability density functions $f_i^R(t)$ of multiple access target data. In particular, the cache hit ratio estimation function generating section 245 of the present embodiment generates the cache hit ratio estimation function $h_i$ for the access target data on the basis of the cache valid time distribution functions $G_i(t)$ for multiple access target data based on the access request arrival probability density function $f_i^R(t)$ and on the basis of the next-access hit time distribution function $F_i(t)$ for that access target data.

The access processing performance estimation function generating section 250 generates the estimation function C for the access processing performance on the basis of the cache hit ratio estimation function $h_i$, access cost $C_i^R$ for a cache hit, and a cache miss access cost $C_i^C$ for each of access target data. The parameter changing section 255 changes the value of a parameter set in the caching device 130 to the value that improves the estimated access processing performance indicated by the access processing performance estimation function C.

FIG. 3 shows a configuration of the group-based statistics obtaining section 210 according to the present embodiment. The group-based statistics obtaining section 210 obtains as statistics about each group i (i=1, 2, ..., M) of access target data, a group-based access request count, requestByClients$_i$, a group-based cache hit count, hitsInMemory$_i$, a group-based entry count, entries$_i$, and a group-based invalidation count, explicitInvalidation$_i$, from the caching device 130. RequestByClients$_i$ is a measured number of access requests received from one or more requesting devices 100 for access target data in a group i. HitsInMemory$_i$ is a measured number of cache hits of the access target data in the group i for access requests. Entries$_i$ is a measured number of access target data currently being cached by the caching device 130 among the access target data belonging to the group i. ExplicitInvalidation$_i$ is a measured number of invalidations of access target data in the group i in the cache. RequestByClients$_i$, hitsInMemory$_i$, and explicitInvalidataion$_i$ may be a count per unit time and entries$_i$ may be the average per unit time or data sampled at unit intervals. The group-based statistics obtaining section 210 has a group-based cache hit ratio obtaining section 300, a group-based entry count obtaining section 310, an access target data count calculating section 320, and a group-based invalidation count obtaining section 330 and obtains statistics for each of access target data on the basis of the measured values.

The group-based cache hit ratio obtaining section 300 obtains the average cache hit ratio $H_i$ measured for all of access target data in each group on the basis of the group-based cache hit count hitsInMemory$_i$ and the group-based access request count requestByClients$_i$, as expressed by Equation (4).

[Equation 4]

$$H_i = hitsInMemory_i / requestByClients_i \qquad (4)$$

Assuming that the access target data that belong to the same group have the same access characteristics, the multiple access target data in the same group will be accessed at the same frequency. Therefore, the cache hit ratio of all of access target data in the group i can be considered to be $H_i$.

The group-based entry count obtaining section 310 obtains a measured group-based entry count entries$_i$ for each group. The access target data count calculating section 320 calculates the estimated number $v_i$ of the access target data belonging to the group on the basis of the group-based entry count entries$_i$ for the group and the average cache hit ratio $H_i$ for the group. Because the multiple access target data that belong to the same group are accessed at the same frequency, the access target data count calculating section 320 can calculate the number $v_i$ of the access target data belonging to each group by dividing the group-based entry count entries$_i$ by the average cache hit ratio $H_i$ as expressed by Equation (5).

[Equation 5]

$$v_i = entries_i / H_i \qquad (5)$$

The group-based invalidation count obtaining section 330 obtains the calculated group-based invalidation count explicitInvalidation$_i$ for each group. If an access target data is modified, the caching device 130 according to the present embodiment invalidates the access target data in the cache and causes the server device 110 to re-generate it. The caching device 130 invalidates the modified access target data in response to an invalidate request by a requesting device 100 or the server device 110. The group-based invalidation count obtaining section 330 counts, on a group-by-group basis, the number of invalidations of access target data caused by invalidate requests.

The group-based statistics obtaining section 210 described above groups access target data appropriately to allow statistics about each individual access target data to be approximated from the statistics about each group. Thus, the caching device 130 can measure statistics about grouped multiple access target data and obtain proper statistics if the frequency of arrivals of each individual access target data is low.

FIG. 4 shows an operation flow in the cache optimizing device 140 according to the present embodiment.

First, the parameter setting section 200 sets the initial values of cache setting parameters in the caching device 130 (step S400). The initial values may be predetermined by an administrator of the information system 10. The information system 10 performs application processes according to the settings. An example of the cache setting parameters in the present embodiment is a parameter specifying, on a group-by-group basis, whether access target data should be cached.

Then, the group-based statistics obtaining section 210 obtains statistics about access requests and/or access responses, measured by the caching device 130 (S410). The group-based statistics obtaining section 210 provides the group-based access request count requestByClients$_i$ it obtained and access target data count $v_i$ calculated by the access target data count calculating section 320 to the access request arrival frequency obtaining section 215. It also provides the group-based cache hit count hitsInMemory$_i$ and the group-based invalidation count explicitInvalidation$_i$ it obtained to the invalidation request arrival frequency obtaining section 220.

Then, the access request arrival frequency obtaining section 215 obtains the average arrival frequency $\lambda_i$ of access requests for each of access target data on the basis of the statistics obtained by the group-based statistics obtaining section 210 (S420). In the present embodiment, the access request arrival frequency obtaining section 215 divides the group-based access request count requestByClients$_i$ by the number $v_i$ of the access target data in each group to obtain the average arrival frequency $\lambda_i$ of access requests for each of access target data, as expressed by Equation (6). Here, the group-based access request count requestByClients$_i$ is the number of access requests per unit time measured for all of access target data that belong to the group, that is, the average arrival frequency of access requests.

[Equation 6]

$$\lambda_i = \text{requestByClients}_i / v_i \qquad (6)$$

Then, the invalidate request arrival frequency obtaining section 220 obtains the measurement of the average arrival frequency $\mu_i$ of invalidate requests for each of access target data on the basis of the statistics obtained by the group-based statistics obtaining section 210 (S430). In the present embodiment, the invalidate request arrival frequency obtaining section 220 obtains the average arrival frequency $\mu_i$ of invalidate requests for each of access target data from the average access request arrival frequency $\lambda_i$ obtained by the access request arrival frequency obtaining section 215 and the group-based invalidation count explicitInvalidation$_i$ and the group-based cache hit count hitsInMemory$_i$ obtained by the group-based statistics obtaining section 210 for each group, as expressed by Equation (7).

[Equation 7]

$$\mu_i = \lambda_i \cdot \text{explicitInvalidation}_i / \text{hitsInMemory}_i \qquad (7)$$

Then, the access request arrival probability density function generating section 225 generates the access request arrival probability density function $f_i^R(t)$ for each of access target data on the basis of the average access request arrival frequency $\lambda_i$ for the access target data (S440). The invalidate request arrival probability density function generating section 230 then generates the access request arrival probability density function $f_i^I(t)$ from the average arrival frequency $\mu_i$ of invalidate requests for each of access target data (S450).

Then, the next-access hit time distribution function generating section 235 generates the next-access hit time distribution function $F_i(t)$ for each of access target data from the access request arrival probability density function $f_i^R(t)$ and the invalidate request arrival probability density function $f_i^I(t)$ (S452). In particular, the next-access hit time distribution function generating section 235 generates the next-access hit time distribution function $F_i(t)$ by following the steps (a) to (d) described below.

(a) The time distribution function $F_i^I(t)$ for the period from the reception of an invalidate request for the access target data until the reception of the next invalidate request for that access target data is generated on the basis of the invalid request arrival probability density function $f_i^I(t)$ (Equation (8)).

[Equation 8]

$$F_i^I = \int_0^t f_i^I(s)ds \qquad (8)$$

(b) The time distribution function $G_i^I(t)$ for the period until the arrival of the next invalidate request (forward waiting time) or for the elapsed period of time (backward elapsed time) since the arrival of the last invalidate request, with respect to a given base point of time, is generated on the basis of the invalidate request arrival probability density function $f_i^I(t)$ and the time distribution function $F_i^I(t)$ (Equation (9)).

[Equation 9]

$$G_i^I(t) = \frac{1}{m_i^R} \int_0^t \left(1 - \int_0^s f_i^I(u)du\right)ds = \frac{1}{m_i^I} \int_0^t (1 - F_i^I(s))ds \qquad (9)$$

$$\left(m_i^I = \int_0^\infty s f_i^I(s)ds\right)$$

(c) The probability $\alpha_i(t)$ that an invalidate request does not arrive by a certain time point t with respect to a given base point of time is generated on the basis of the time distribution function $G_i^I(t)$ (Equation (10)).

[Equation 10]

$$\alpha_i(t) = 1 - G_i^I(t) \qquad (10)$$

(d) The next-access hit time distribution function $F_i(t)$ is generated on the basis of the probability $\alpha_i(t)$ and the access request arrival probability density function $f_i^R(t)$ (Equation (11)).

[Equation 11]

$$F_i(t) = \int_0^t \alpha_i(s) f_i^R(s) ds \qquad (11)$$

In this way, the next-access hit time distribution function generating section 235 generates the next-access hit time distribution function $F_i(t)$ by using as an input the setting parameter specifying whether each of access target data should be cached. For example, if the access target data in a group i is not cached, the next-access hit time distribution function generating section 235 generates the next-access hit time distribution function $F_i(t)$ for performing the calculations described above by using "0" for both the access request arrival probability density function $f_i^R(t)$ and the invalidate request arrival probability density function $f_i^I(t)$ for the group i.

Then, the cache valid time distribution function generating section 240 generates cache valid time distribution function $G_i(t)$ for each of access target data on the basis of the access request arrival probability density function $f_i^R(t)$ and the invalidate request arrival probability density function $f_i^I(t)$ (S454). In particular, the cache valid time distribution function generating section 240 generates the cache valid time distribution function $G_i(t)$ by following steps (a) and (b) described below.

(a) The time distribution function $F_i^R(t)$ for the period from the reception of an access request for the access target data until the reception of the next access request for that access target data is generated on the basis of the access request arrival probability density function $f_i^R(t)$ (Equation (12)).

[Equation 12]

$$F_i^R(t) = \int_0^t f_i^R(s) ds \qquad (12)$$

(b) The cache valid time distribution function $G_i(t)$ is generated on the basis of the probability $\alpha_i(t)$ generated by the next-access hit time distribution function generating section 235 and the time distribution function $F_i^R(t)$ and the access request arrival probability density function $f_i^R(t)$.

The cache valid time distribution function $G_i(t)$ is the probability that an access request arrives in the period between time 0 and time t and an invalidate request does not arrive in the period between the arrival of the access request and time t. Therefore, it can be obtained from Equation (13).

[Equation 13]

$$G_i(t) = \frac{1}{m_i^R} \int_0^t \alpha_i(t-s)(1 - F_i^R(t-s))ds \qquad (13)$$

$$= \frac{1}{m_i^R} \int_0^t \alpha_i(s)(1 - F_i^R(s))ds \left(m_i^R = \int_0^\infty s f_i^R(s)ds\right)$$

In this way, the cache valid time distribution function generating section 240 generates the cache valid time distribution function $G_i(t)$ by using as an input the setting parameter specifying whether each of access target data should be cached or not. For example, if the access target data in a group i is not cached, the cache valid time distribution function generating section 240 generates the cache valid time distribution function $G_i(t)$ for performing the calculations described above by using "0" for both the access request arrival probability density function $f_i^R(t)$ and the invalidate request arrival probability density function $f_i^I(t)$ for the group i.

Then, the cache hit ratio estimation function generating section 245 generates for the access target data belonging to each group the cache hit ratio estimation function $h_i$ for each of access target data on the basis of the cache valid time distribution function $G_i(t)$ for the multiple access target data and the next-access hit time distribution function $F_i(t)$ for that access target data (S460). The input to the next-access hit time distribution function $F_i(t)$ and the cache valid time distribution function $G_i(t)$ is a setting parameter. Thus, the cache hit ratio estimation function generating section 245 can generate the cache hit ratio estimation function $h_i$ using the parameter as an input.

Then, the access processing performance estimation function generating section 250 generates the access processing performance estimation function C based on the cache hit ratio estimation function $h_i$ for each of access target data, the access cost $C_i^R$ for a cache hit, and the cache miss access cost $C_i^C$ (S470). In particular, the access processing performance estimation function generating section 250 generates the access processing performance estimation function C based on the access target data count $v_i$ and average access request arrival frequency $\lambda_i$ for group i calculated by the group-based statistics obtaining section 210 and the access request arrival frequency obtaining section 215, respectively, and the cache hit ratio estimation function $h_i$ for the access target data, and the access costs $C_i^R$ and $C_i^C$ for a cache hit and a cache miss, respectively, by using Equation (14).

[Equation 14]

$$C = \sum_{i=1}^{M} v_i \lambda_i (h_i C_i^r + (1-h_i) C_i^C) \qquad (14)$$

The cache hit ratio estimation function $h_i$ is a function using a setting parameter as an input. Thus, the access processing performance estimation function generating section 250 can generate the access processing performance estimation function C using the parameter as an input.

Then, the parameter changing section 255 changes the value of the setting parameter set in the caching device 130 to a value that improves the estimated access processing performance with the access processing performance estimation function (S480). The parameter changing section 255 according to the present embodiment follows the local search method shown in steps (a) to (d) described below to obtain the setting parameter that improves the estimated access processing performance and sets the parameter in the caching device 130.

(a) The estimated access processing performance is calculated with the current setting parameter.

(b) The optimum parameter set is initialized to a void set.

(c) The estimated access processing performances are calculated with the setting parameter for each group that is to be included in the optimum parameter set, for both case of caching the access target data belonging to the group and of not caching them. If the estimated value of the access processing performance achieved in the case where the access target data are cached is higher than that in the case of not being cached, then the setting parameter to cache the access target data belonging to the group is added to the optimum parameter set. On the other hand, if the estimated value of the access processing performance achieved in the case where the access target data are cached is not higher than that in the case of not being cached, then the setting parameter not to cache the access target data belonging to the group is added to the optimum parameter set.

(d) If the estimated access processing performance with the optimum parameter set obtained by performing step (c) for all groups is higher than the estimated access processing performance with the current parameter set, the optimum parameter set is set in the caching device 130.

Instead of step (c) described above, the parameter changing section 255 may perform the following process.

(c') For the setting parameter for each group in the current setting parameter, if the current setting parameter specifies that the access target data belonging to the group are to be cached, the estimated access processing performance that would be achieved with the parameter not to cache them is calculated. If the estimated value of the access processing performance achieved in the case where the access target data are not cached is higher than the estimated access processing performance achieved with the optimum parameter set, then the setting parameter that is changed so as not to cache the access target data belonging to the group is added to the optimum parameter set.

On the other hand, if the current setting parameter specifies that the access target data belonging to that group are not to be cached, the estimated access processing performance that would be achieved with the parameter to cache them is calculated. If the estimated value of the access performance achieved in the case where the access target data are cached is higher than that achieved with the optimum parameter set, then the setting parameter in the current parameter set is changed so as to cache the access target data belonging to the group and then the resulting parameter set is set as the optimum parameter set.

The cache optimizing device 140 repeats the process from S410 to S480 at regular intervals, for example, to maintain the setting parameter in the caching device 130 at the optimum value (S490).

In this way, the parameter changing section 255 can set in the caching device 130 a setting parameter specifying that access target data should be cached on the condition that the estimated value of the access processing performance in the case where the access target data is cached is higher than that in the case of not being cached. The parameter changing section 255 can determine, on the basis of the access processing performance estimation function C, the optimum parameter set for specifying whether or not access target data should be cached for all groups, and then set them in the caching device 130. As a result, the cache optimizing device 140 can optimize the access processing performance of the caching device 130 efficiently compared with the case where specification as to whether data should be cached or not is tried for each individual group.

If a method is used in which the caching device 130 invalidates access target data upon timeout, the time distribution function described below may be used instead of the next-access hit time distribution function $F_i(t)$ and the cache valid time distribution function $G_i(t)$ in Equations (11) and (13).

In this method, when the caching device 130 receives an invalidate request for an access target data currently being cached, or if a predetermined timeout period $\tau_i$ has elapsed without receiving an access request for an access target data since the data was cached, the caching device 130 invalidates that access target data in the cache. Accordingly, when the timeout period $\tau_i$ has elapsed since arrival of an access request, the next-access hit time distribution function $F_i(t)$ and the cache valid time distribution function $G_i(t)$ remain the same. Therefore, the next-access hit time distribution function generating section 235 and the cache valid time distribution function generating section 240 use different equations for the period before the predetermined timeout $\tau_i$ and the period after the timeout to generate the next-access hit time distribution function $F_i(t)$ and the cache valid time distribution function $G_i(t)$ (Equations (15) and (16)).

[Equation 15]

$$F_i(t) = \begin{cases} \int_0^t \alpha_i(s) f_i^R(s) ds & (t \leq \tau_i) \\ \int_0^{\tau_i} \alpha_i(s) f_i^R(s) ds & (t > \tau_i) \end{cases} \quad (15)$$

[Equation 16]

$$G_i(t) = \begin{cases} \frac{1}{m_i^R} \int_0^t \alpha_i(s)(1 - F_i^R(s)) ds & (t \leq \tau_i) \\ \frac{1}{m_i^R} \int_0^{\tau_i} \alpha_i(s)(1 - F_i^R(s)) ds & (t > \tau_i) \end{cases} \quad (16)$$

In the process described above, if the access request arrival probability density function $f_i^R(t)$ and the invalidate request arrival probability density function $f_i^I(t)$ are not exponential distributions, it may be difficult to calculate the integral functions in Equations (11) and (13), or Equations (15) and (16). In such a case, the next-access hit time distribution function generating section 235 and the cache valid time distribution function generating section 240 may generate the next-access hit time distribution function $F_i(t)$ and the cache valid time distribution function $G_i(t)$ based on an access request arrival probability density function $f_i^R(t)$ and an invalidate request arrival probability density function $f_i^I(t)$ approximated by using line segments.

FIG. 5 shows a configuration of the cache hit ratio estimation function generating section 245 according to the present embodiment. The cache hit ratio estimation function generating section 245 includes an entry count expected value function generating section 500, a cache fill time calculating section 510, and a next-access hit ratio estimation function generating section 520.

The entry count expected value function generating section 500 generates an entry count expected value function $G(t)$ on the basis of the cache valid time distribution function $G_i(t)$ of multiple access target data. Here, the entry count expected value function $G(t)$ is the function for obtaining the expected number of access target data being cached without being invalidated. The cache valid time distribution function $G_i(t)$ represents the probability that an access request for an access target data belonging to a group i will arrive by time t and the access target data will not have been invalidated by time t. Therefore, the entry count expected value function generating section 500 can multiply the cache valid time distribution function $G_i(t)$ by the number $v_i$ of the access target data that belong to the group i to obtain the expected number of access target data belonging to the group i being cached without being invalidated. Then, the entry count expected value function generating section 500 sums the expected value for all groups to obtain the entry count expected value function $G(t)$ as expressed by Equation (17).

[Equation 17]

$$G(t) = \sum_i v_i G_i(t) \quad (17)$$

The cache fill time calculating section 510 calculates, on the basis of the entry count expected value function $G(t)$, the expected cache fill time $T_{fill}$, taken for K access target data to be cached, with respect to a predetermined base point of time. In particular, the cache fill time calculating section 510 calculates the expected value of the cache fill time $T_{fill}$ taken for the value of the entry count expected value function $G(t)$ to reach the cache size K as expressed by Equation (18)

[Equation 18]

$$k = G(T_{fill}) \Rightarrow T_{fill} = G^{-1}(k) \quad (18)$$

The next-access hit ratio estimation function generating section 520 calculates, on the basis of the next-access hit time distribution function $F_i(t)$, the function representing the probability that an access request for an access target data will be received in the period from the reception of the previous access request for the access target data until the time determined by the expected value of the cache fill time $T_{fill}$ elapses, and sets it as the cache hit ratio estimation function $h_i$ for the access target data. In particular, the next-hit ratio estimation function generating section 520 calculates the provability that an access request for an access target data of interest will arrive by the time the cache fill time $T_{fill}$ elapses and the access target data will not have been invalidated, by using Equation (19) and sets it as the cache hit ratio estimation function $h_i$.

[Equation 19]

$$h_i = F_i(G^{-1}(K)) \quad (19)$$

The cache optimizing device 140 described above can analytically estimate the cache hit ratio of access target data in each group in the LRU-based caching device 130 even if the access costs involved in a cache miss differ among different groups. The cache optimizing device 140 can precisely calculate the access processing performance estimation function based on the cache hit ratio for each group. Consequently, the cache optimizing device 140 can precisely determine optimum setting parameters by using the access processing performance estimation function, thereby efficiently improving the access processing performance of the caching device 130.

In the case where timeout of access target data is provided, it is possible that more than K access target data are cached before time $T_{fill}$ and then invalidated upon timeout, even if the number of access target data being cached at time $T_{fill}$ is K. In such a case, the access target data will be replaced, thereby resulting in a cache miss. Therefore, the cache optimizing device 140 uses the cache hit ratio estimation function $h_i$ that satisfies Equations (17) to (19) as an approximate expression for providing the upper-bound cache hit ratio.

Also in the case where timeout of access target data is provided, the next-access hit time distribution function $F_i(t)$ and the cache valid time distribution function $G_i(t)$ will become discontinuous at time $\tau_i$. Therefore, the entry count expected value function generating section 500 may sort the access target data based on the value of timeout $\tau_i$ and calculate the expected cache fill time $T_{fill}$ for each period separated by a number of timeouts $\tau_i$.

FIG. 6 shows an example of a method for optimizing access processing performance performed by a cache optimizing device 140 according to a first variation of the present embodiment. In this variation, a caching device 130 caches each of access target data 600 into a predetermined cache partition 610 for the access target data among multiple cache partitions 610 into which the cache memory area 135 of the caching device 130 is divided.

FIG. 6(*a*) illustrates access processing performance optimization by displacing access target data 600. In FIG. 6(*a*), the caching device 130 caches each of access target data 600 into a cache partition 610 predetermined with a setting parameter and associated with the access target data. The cache optimizing device 140 changes the setting parameter to optimize which access target data 600 should be cached in which cache partitions 610, thereby improving the access processing performance of the caching device 130.

In particular, a parameter setting section 200 sets the initial value of a setting parameter in the caching device 130 to specify which cache partition 610 each of access target data 600 should be cached in. The parameter setting section 200 may specify that at least one of access target data 600 should not be cached.

Then, a cache hit ratio estimation function generating section 245 and an access processing performance estimation function generating section 250 generate a cache hit ratio estimation function $h_i$ and an access processing performance estimation function C, respectively, by using as inputs a combination of associations specifying which access target data 600 should be cached in which cache partitions 610, or should not be cached. For example, the cache hit ratio estimation function generating section 245 and the access processing performance estimation function generating section 250 generate for each cache partition 610 the hit ratio estimation function and access processing performance estimation function for the access target data to be cached in that cache partition 610. The access processing performance estimation functions for the cache partitions 610 are summed to generate the access processing performance estimation function C of the caching device 130.

If the estimated access processing performance achieved with a first combination of associations specifying which access target data 600 should be cached in which cache partition 610, or should not be cached is higher than that achieved with a second combination, the parameter changing section 255 sets a setting parameter specifying the first combination in the caching device 130. In particular, the parameter changing section 255 finds an optimum association parameter set for specifying which access target data 600 should be cached in which cache partitions 610 in a manner similar to the local search method described with respect to S480 in FIG. 4, and sets it in the caching device 130.

FIG. 6(*b*) illustrates access processing performance optimization by changing the size of a cache partition 610. In FIG. 6(*b*), the cache optimizing device 140 improves the access processing performance of the caching device 130 by changing a setting parameter to optimize, for each of multiple cache partitions 610 to which access target data 600 are specified in advance to be allocated, the proportion of the cache parameter partition 610 to the cache memory area 135.

In particular, the cache hit ratio estimation function generating section 245 and the access processing performance estimation function generating section 250 generate a cache hit rate estimation function $h_i$ and the access processing performance estimation function C, respectively, by using as inputs a combination of the proportions of multiple cache partitions 610 to the cache memory area 135. For example, the cache hit ratio estimation function generating section 245 and the access processing performance estimation function generating section 250 generate the hit ratio estimation function and the access processing performance estimation function for each access target data to be cached in each cache partition 610 by using as inputs the number K of access target data that can be cached in that cache partition 610. Then, the access processing performance functions of the cache partitions 610 are summed to generate the access processing performance function C of the caching device 130.

If the estimated access processing performance achieved with a first combination of the proportions of multiple cache partitions 610 to the cache memory area 135 is higher than that achieved with a second combination, the parameter changing section 255 sets a setting parameter specifying the first combination of the proportions of multiple cache partitions 610 in the caching device 130. In particular, the parameter changing section 255 uses a steepest descent method to determine a combination of proportions of cache partitions 610 that provides the highest estimated access processing performance and sets it in the caching device 130.

The cache optimizing device 140 according to the first variation described above can optimize the allocation of access target data 600 and/or the size of the cache partitions 610 when allocating the access target data 600 to the multiple cache partitions 610.

FIG. 7 shows a configuration of a caching device 130 according to a second variation of the present embodiment. The caching device 130 according to the second variation uses a priority LRU cache policy. The caching device 130 includes a cache memory area 135, an access request handling section 700, an LRU list managing section 710, an entry displacing section 730, an LRU list shifting section 740, and a statistics measuring section 750.

The access request handling section 700 processes access requests from a requesting device 100. In particular, the access request handling section 700 determines whether the access target data 600 that is requested by an access request is currently being cached in the cache memory area 135, on the basis of information managed by the LRU list managing section 710. If the access target data 600 is currently cached, the access request handling section 700 reads out the access target data 600 from the cache memory area 135 and returns it to the requesting device 100. On the other hand, if access target data 600 is not cached, the access request handling section 700 transfers the access request to a server device 110. Then, the access request handling section 700 returns the access target data 600 returned from the server device 110 to the requesting device 100 and also stores it in the cache memory area 135.

The LRU list managing section 710 manages multiple access target data 600 stored in the cache memory area 135. In the present variation, a caching priority is assigned to each of access target data 600. Accordingly, the LRU list managing section 710 has a number of LRU lists 715 provided for each priority for managing the cached access target data 600 by using the LRU policy. Each of the LRU lists 715 manages one or more pointers 720 identifying one or more access target data 600 stored in the cache memory area 135 through a list structure.

The entry displacing section 730 displaces an access target data 600 requested by an access request to the top of the LRU list 715 corresponding to the priority of the access target data 600. Thus, the entry displacing section 730 can provide an LRU cache that reflects the priorities of the access target data 600.

When the lowest-priority LRU list 715 becomes empty, the LRU list shifting section 740 sifts access target data 600 from a number of LRU lists 715 to lower priority LRU lists 715. For example, if the LRU list managing section 710 has a first to third LRU lists 715 and the lowest priority is assigned to the first LRU list 715, the LRU list shifting section 740 shifts the access target data 600 entered in the second LRU list 715 to the first LRU list 715 and shifts the access target data 600 entered in the third LRU list 715 to the second LRU list 715, on condition that the first LRU list 715 becomes empty.

The statistics measuring section 750 measures statistics about access requests and/or access responses, such as the group-based access request count requestByClients$_i$, group-based cache hit count hitsInMemory$_i$, group-based entry count entries$_i$, and group-based invalidation count explicit-Invalidation$_i$, and provides them to a group-based statistics obtaining section 210 in the cache optimizing device 140.

In the caching device 130 described above, higher-priority access target data 600 are entered in higher-priority LRU lists 715. Consequently, the caching device 130 allows access target data 600 to be kept in the cache memory area 135 for a period almost proportional to their priorities.

FIG. 8 shows a configuration of a cache hit ratio estimation function generating section 245 according to the second variation of the present embodiment. The cache hit ratio estimation function generating section 245 can generate the cache hit ratio estimation function h$_i$ for each of access target data in the caching device 130 shown in FIG. 7. Whenever a shift is performed on the LRU lists 715, the status of the caching device 130 shown in FIG. 7 changes discontinuously. Therefore, the cache hit ratio estimation function generating section 245 of the present variation assumes that the data on the LRU lists 715 is shifted at regular intervals and models the priority LRU cache accordingly.

The cache hit ratio estimation function generating section 245 includes an entry count expected value function generating section 800, a shift cycle period calculating section 810, a replacing time calculating section 820, a next-access hit ratio estimation function generating section 830, and a next-access hit ratio averaging section 840. The entry count expected value function generating section 800 generates an entry count expected value function H(t) based on the cache valid time distribution function G$_i$(t) for multiple access target data. Here, the entry count expected value function H(t) is a function for obtaining the expected total number of access target data entered in the multiple LRU lists 715 at time t with respect to the previous shift. In particular, the entry count expected value function generating section 800 generates the entry count expected value function H(t) on the basis of the cache valid time distribution function G$_i$(t) for each group, the number v$_i$ of access target data in each group, and the priority φ$_i$ of the access target data in each group, as expressed by Equation (20).

[Equation 20]

$$H(t) = \sum_{i=1}^{M} v_i G_i(\phi_i t) \quad (20)$$

In Equation (20), the input to the cache valid time distribution function is φ$_i$·t, which reflects that access target data are not removed from the cache until a number of shifts that are equivalent to their priorities φ$_i$ are performed.

The shift cycle period calculating section 810 calculates the expected value of the shift cycle period T$_r$ based on the entry count expected value function H(t). In particular, the shift cycle period calculating section 810 calculates the expected value of time taken for the value of the entry count expected value function H(t) becomes equal to the cache size K, as expressed by Equation (21), and sets it as the expected value of the shift cycle period Tr.

[Equation 21]

$$T_r = H^{-1}(k) \quad (21)$$

The replacing time calculating section 820 calculates, at periodic time intervals, the length of which is equal to the shift cycle period divided by L, the expected value G(t,l) of the replacing time that elapses between the reception of an access request for an access target data and the replacement of the access target data with another access target data. In particular, an access target data of interest is replaced when another data with a higher priority is placed in the cache in the caching device 130. As the priority of the access target data of interest lowers at each shift, the number of access target data contributing to the replacement of the access target data increases. The replacing time calculating section 820 takes these into account to calculate the expected replacing time G(t,l) based on the cache valid time distribution function G$_i$(t) for a group i, the priority φ$_i$, the number v$_i$ of access target data belonging to the group i, and the expected value of the shift cycle period Tr, as expressed by Equation (22).

[Equation 22]

$$G(t, l) = \sum_{\phi_j > \phi_i} v_j G_j\left(t + (\phi_j - \phi_i)T_r + \frac{T_r}{L}l\right) + \sum_{\phi_j > \phi_i} v_j G_j(t) + \sum_{\phi_j > \phi_i} v_j G_j\left(t + (\phi_j - \phi_i - 1)T_r + \frac{T_r}{L}l\right) \quad (22)$$

The next-access hit ratio estimation function generating section 830 generates a next-access hit ratio estimation function h$_i$, on the basis of the next-access hit time distribution function F$_i$(t) and replacing time G(t,l) for each of access target data. The next-access hit ratio estimation function h$_{i,l}$ is the probability, at the periodic time intervals, the length of which is equal to the shift cycle period divided by L, that an access request for an access target data will be received in a period from the reception of the previous access request for that access target data until the lapse of the time T$_r$ determined by the expected replacing time. In particular, the next-access hit ratio estimation function generating section 830 generates the next-access hit ratio estimation function h$_{i,l}$, similarly to the cache fill time calculating section 510 and the next-access hit ratio estimation function generating section 520 shown in FIG. 5, as expressed by Equation (23).

[Equation 23]

$$h_{i,l} = F_i(G^{-1}(k,l)) \quad (23)$$

The next-access hit ratio averaging section 840 calculates, for each of access target data, the average of the next-access hit ratio estimation functions h$_{i,l}$ at all of the time intervals into which the shift cycle period is divided, in the case where an access request for the access target data is received at each of the intervals, and sets it as the cache hit ratio estimation function $h_i$ for that access target data. That is, the next-access hit ratio averaging section 840 generates the cache hit ratio estimation function $h_i$ as expressed by Equation (24).

[Equation 24]

$$h_i = \frac{1}{L}\sum_{l=0}^{L-1} h_{i,l} \quad (24)$$

In the cache optimizing device 140 according to the present variation, the parameter changing section 255 finds a setting parameter that improves the estimated access processing performance, for the priority $\phi_i$ of caching the access target data in each group in a manner similar to the local search method described with respect to S480 in FIG. 4, and sets it in the caching device 130. That is, the cache hit ratio estimation function generating section 245 and the access processing performance estimation function generating section 250 generate the cache hit ratio estimation function $h_i$ and the access processing performance estimation function C, respectively, by using as inputs the caching priorities of the access target data. If the estimated access processing performance achieved by assigning a first caching priority to an access target data is higher than the performance achieved by assigning a second caching priority to the access target data, the parameter changing section 255 sets in the caching device 130 a setting parameter assigning the first caching priority to that access target data. Thus, the cache optimizing device 140 can optimize the setting parameters with a priority for caching the access target data in a priority-LRU-based caching device 130.

FIG. 9 shows an example of a cache optimizing device 140 according to a third variation of the present embodiment. The components in FIG. 9 that are labeled with the same reference numerals as those in those in FIG. 2 have similar functions and configuration and therefore only differences will be described.

The cache optimizing device 140 according to the third variation further optimizes allocation of a plurality of access target data to a number of caching devices 130. To implement this, the cache optimizing device 140 includes a function-for-integration generating section 920, a group integrating section 930, a function-for-disintegration generating section 940, and a group disintegrating section 950 in addition to the cache optimizing device 140 shown in FIG. 2.

The function-for-integration generating section 920 and the group integrating section 930 integrate groups having the same access characteristics in a number of caching devices 130 into groups in one caching device 130. For example, if a first JVM (Java® Virtual Machine) functioning as a first caching device 130 and a second JVM functioning as a second caching device 130 are running, access job allocation is changed to allow the second JVM to perform access jobs that would otherwise be performed by the first JVM.

The function-for-integration generating section 920 generates the access processing performance estimation function C that will be achieved if groups in a number of caching devices 130 are integrated into corresponding groups in one caching device 130. Here, the integration of the groups does not affect the total number of access requests, $v_i\lambda_i$, and the total number of invalidate requests, $\mu_i\mu_i$. On the other hand, the total numbers of access target data $v_i$ that belong to the groups or the average arrival frequencies $\lambda_i$ and $\mu_i$ of access requests and invalidate requests for each access target data can change because groups with the same access characteristics are integrated.

An example in which the total number of access target data $v_i$ may change is a case where a number of caching devices 130 are providing the same service to different users. In such a case, the average arrival frequencies of access requests and invalidate requests relating to each user are not changed by the access job integration, but the total number of access target data $v_i$ after integration becomes equal to the sum of the number of access target data before integration. In such a case, therefore, the function-for-integration generating section 920 directs a group-based statistics obtaining section 210 to make the average access request arrival frequency $\lambda_i$ and the average invalidate request arrival frequency $\mu_i$ after integration identical to the average arrival frequencies at the caching devices 130 before integration and make the number of access target data $v_i$ after integration equal to the sum of access target data in the caching devices 130 before integration. In response to this direction, the group-based statistics obtaining section 210 changes the number of access target data, and an access request arrival frequency obtaining section 215, an invalid request arrival frequency obtaining section 220, an access request arrival probability density function generating section 225, an invalidate request arrival probability density function generating section 230, next-access hit time distribution function generating section 235, cache valid time distribution function generating section 240, a cache hit ratio estimation function generating section 245, and an access processing performance estimation function generating section 250 generate the post-integration access processing performance estimation function C.

An example in which the average arrival frequencies $\lambda_i$ and $\mu_i$ of access requests and invalidate requests for a plurality of access target data change is a case where a number of caching devices 130 provide services for accesses from users through distributed processing. In such a case, the number of access target data is not changed by integration, but the average access request and invalidate request arrival frequencies $\lambda_i$ and $\mu_i$ for each user become equal to the sums of the values before integration. In such a case, therefore, the function-for-integration generating section 920 directs the access request arrival frequency obtaining section 215 and the invalidate request arrival frequency obtaining section 220 to make the average access request and invalidate request arrival frequencies $\lambda_i$ and $\mu_i$ after integration equal to the sums of the average access request and invalidate request arrival frequencies at the cache devices before integration. In response to this direction, the access request arrival frequency obtaining section 215 and the invalidate request arrival frequency obtaining section 220 change the average arrival frequencies of the access requests and invalidate requests, and the access request arrival probability density function generating section 225, invalidate request arrival probability density function generating section 230, next-access hit time distribution function generating section 235, cache valid time distribution function generating section 240, cache hit ratio estimation function generating section 245, and access processing performance estimation function generating section 250 generate the post-integration access processing performance estimation function C.

Then, the function-for-integration generating section 920 obtains the access processing performance estimation function C generated by the access processing performance estimation function generating section 250 with the parameters changed according to the direction and generates the post-integration access processing performance estimation function C'.

If the estimated access processing performance derived from the access processing performance estimation function C' generated by computer 900 is higher than the sum of the estimated values of the access processing performance of the multiple caching devices 130, the group integrating section 930 integrates relevant groups in the multiple caching devices 130 into their corresponding groups in one caching device 130. That is, the group integrating section 930 directs the caching devices 130 to integrate the groups, through a parameter changing section 255.

The function-for-disintegration generating section 940 and the group disintegrating section 950 perform a process for disintegrating groups in one caching device 130 into groups in multiple caching devices 130. For example, it changes access job allocation to allow a second JVM to perform access jobs that would otherwise be performed by a first JVM.

The function-for-disintegration generating section 940 generates the access processing performance estimation function for each of the multiple caching devices 130 that would be achieved when groups in one caching device 130 are disintegrated into relevant groups in multiple caching devices 130. The total number of access requests $v_i$ and $\lambda_i$ and the total number of invalidate requests $v_i \mu_i$ are not affected by the disintegration of the groups. On the other hand, the number of access target data belonging to the groups or the average arrival frequencies of access requests and invalidate access request for each access target data may change in a manner similar to integration of groups.

To change the number of access target data in each of the caching devices 130, the function-for-disintegration generating section 940 directs the group-based statistics obtaining section 210 to make the sum of the numbers of access target data in the groups in the caching device 130 resulting from disintegration equal to the number of the access target data in the groups in the caching device 130 before the disintegration. In response to this direction, the group-based statistics obtaining section 210 performs an operation such as division of the number of access target data in the caching device 130 before disintegration by the number of the caching devices 130 after the disintegration to obtain the number of access target data in each of the caching devices 130 after the disintegration. Then, the access request arrival frequency obtaining section 215, the invalidate request arrival frequency obtaining section 220, the access request arrival probability density function generating section 225, the invalidate request arrival probability density function generating section 230, the next-access hit time distribution function generating section 235, the cache valid time distribution function generating section 240, the cache hit ratio estimation function generating section 245, and the access processing performance estimation function generating section 250 generate the access processing performance estimation function in each of the caching devices 130 that would be achieved after the disintegration.

On the other hand, to change the average arrival frequencies of access requests and invalidate requests in each of the caching devices 130, the function-for-disintegration generating section 940 directs the access request arrival frequency obtaining section 215 and the invalidate request arrival frequency obtaining section 220 to make the sum of the average arrival frequencies in the caching devices 130 after the disintegration equal to the average arrival frequency of those groups in the caching device 130 before disintegration. In response to this direction, the access request arrival frequency obtaining section 215 and invalidate request arrival frequency obtaining section 220 perform an operation such as division of the number of average arrival frequency in the caching device 130 before the disintegration by the number of the caching devices 130 after the disintegration to obtain the average arrival frequency in each of the caching devices 130 after the disintegration. Then, the access request arrival frequency obtaining section 215, the invalidate request arrival frequency obtaining section 220, the access request arrival probability density function generating section 225, the invalidate request arrival probability density function generating section 230, the next-access hit time distribution function generating section 235, the cache valid time distribution function generating section 240, the cache hit ratio estimation function generating section 245, and the access processing performance estimation function generating section 250 generate the access processing performance estimation function in each of the caching devices 130 that would be achieved after the disintegration.

Then the function-for-disintegration generating section 940 obtains the access processing performance estimation function of each caching device 130 that was generated by the access processing performance estimation function generating section 250 based on parameters changed according to the direction and generates the post-disintegration access processing performance estimation function in each of the caching devices 130.

If the sum of the estimated values of access processing performance based on the access processing performance estimation function generated by the function-for-disintegration generating section 940 is higher than the estimated value of access processing performance of the one caching device 130 before disintegration, the group disintegrating section 950 disintegrates the groups in the one caching device 130 into appropriate groups in the multiple caching devices 130. That is, the group disintegrating section 950 directs the caching device 130 to disintegrate the groups, through the parameter changing section 255.

The group integrating section 930 and the group disintegrating section 950 described above can integrate multiple groups into one group or disintegrates one group into multiple groups to change the number of caching devices 130 appropriately. Furthermore, the group integrating section 930 and the group disintegrating section 950 can cooperate to restore the allocation of the multiple caching devices 130 to the initial state and then reallocate them.

First, the group integrating section 930 integrates the groups in multiple caching devices 130 in their corresponding groups in one caching device 130. Then, the group disintegrating section 950 obtains the estimated values of the access processing performance that would be achieved if the groups integrated in the groups in the one caching device 130 are disintegrated into groups in multiple caching devices 130, in different numbers of caching devices 130. The group disintegrating section 950 then disintegrates the integrated groups in the one caching device 130 into groups in the number of caching devices 130 that provide the highest estimated access processing performance.

The caching optimizing device 140 described above can integrate or disintegrate groups to allow an optimum number of caching devices 130 to be used to perform access processing in an environment in which multiple caching devices 130 are available. Thus, the cache optimizing device 140 can dynamically change the number of JVMs running application servers according to the access request arrival frequency to ensure the SLA (Service Level Agreement).

FIG. 10 shows an exemplary hardware configuration of a computer 900 of the present invention. The computer 900 according to the present embodiment includes a CPU section including a CPU 1000, a RAM 1020, a graphic controller 1075, and display device 1080 interconnected through a host controller 1082, an input/output section including a communication interface 1030, a hard disk drive 1040, and a CD-ROM drive 1060, which are connected to the host controller 1082 through an input/output controller 1084, and a legacy input/output section including a ROM 1010, a flexible-disk drive 1050, and an input/output chip 1070, which are connected to the input/output controller 1084.

The host controller 1082 connects the RAM 1020 with the CPU 1000 and the graphic controller 1075, which access the RAM 1020 at higher transfer rates. The CPU 1000 operates according to programs stored in the ROM 1010 and the RAM 1020 to control components of the computer. The graphic controller 1075 obtains image data generated by the CPU 1000 on a frame buffer provided in the RAM 1020 and causes it to be displayed on the display device 1080. Alternatively, the graphic controller 1075 may contain a frame buffer for storing image data generated by the CPU 1000.

The input/output controller 1084 connects the host controller 1082 with the communication interface 1030, the hard disk drive 1040, and the CD-ROM drive 1060, which are relatively fast input/output devices. The communication interface 1030 communicates with external devices through a network. The hard disk drive 1040 stores programs and data used by the CPU 1000 in the computer 900. The CD-ROM drive 1060 reads a program or data from a CD-ROM 1095 and provides it to the hard disk drive 1040 through the RAM 1020.

Connected to the input/output controller 1084 are relatively slow input/output devices such as ROM 1010, the flexible-disk drive 1050 and input/output chip 1070. The ROM 1010 stores a boot program executed by the computer 900 during boot-up and programs dependent on the hardware of the computer 900. The flexible-disk drive 1050 reads a program or data from a flexible disk 1090 and provides it to the hard disk drive 1040 through the RAM 1020.

Connected to the input/output chip 1070 are a flexible-disk drive 1050 and input/output devices through ports such as a parallel port, serial port, keyboard port, and mouse port, for example.

A program to be provided to the hard disk drive 1040 through the RAM 1020 is stored on a recording medium such as a flexible disk 1090, a CD-ROM 1095, or an IC card and provided by a user. The program is read from the recording medium, installed in the hard disk drive 1040 in the computer 900 through the RAM 1020, and executed in the CPU 1000.

The program which is installed in the computer 900 and causes the computer 900 to function as the cache optimizing device 140 includes a parameter setting module, a group-based statistics obtaining module, an access request arrival frequency obtaining module, an invalidate request arrival frequency obtaining module, an access request arrival probability density function generating module, an invalidate request arrival probability density function generating module, a next-access hit time distribution function generating module, a cache valid time distribution function generating module, a cache hit ratio estimation function generating module, an access processing performance estimation function generating module, a parameter changing module, a function-for-integration generating module, a group integrating module, a function-for-disintegration generating module, and a group disintegrating module. These programs or modules control the CPU 1000 and other components to cause the computer 900 to function as the parameter setting section 200, group-based statistics obtaining section 210, access request arrival frequency obtaining section 215, invalidate request arrival frequency obtaining section 220, access request arrival probability density function generating section 225, invalidate request arrival probability density function generating section 230, next-access hit time distribution function generating section 235, cache valid time distribution function generating section 240, cache hit ratio estimation function generating section 245, access processing performance estimation function generating section 250, parameter changing section 255, function-for-integration generating section 920, group integrating section 930, function-for-disintegration generating section 940, and a group disintegrating section 950.

The group-based statistics obtaining module includes a group-based cache hit ratio obtaining module, a group-based entry count obtaining module, access-target data count calculating module, and a group-based invalidation count obtaining module. These programs or modules control the CPU 1000 and other components to cause the computer 900 to function as the group-based cache hit ratio obtaining section 300, group-based entry count obtaining section 310, access target data count calculating section 320, and group-based invalidation count obtaining section 330.

The cache hit ratio estimation function generating module includes an entry count expected value function generating module, a cache fill time calculating module, and a next-access hit ratio estimation function generating module, or entry count expected value function generating module, a shift cycle period calculation module, a replacing time calculating module, a next-access hit ratio estimation function generating module, and a next-access hit ratio averaging module. These programs or modules control the CPU 1000 and other components to cause the computer 900 to function as the entry count expected value function generating section 500, cache fill time calculating section 510, next-access hit ratio estimation function generating section 520, entry count expected value function generating section 800, shift cycle period calculating section 810, replacing time calculating section 820, next-access hit ratio estimation function generating section 830, and next access hit ratio averaging section 840.

The programs or modules provided above may be stored in an external storage medium. The storage medium may be a flexible disk 1090 or a CD-ROM 1095, or an optical recording medium such as a DVD and CD, a magneto-optical recording medium such as an MO, a tape medium, or a semiconductor memory such as an IC card. Alternatively, a storage device such as a hard disk or a RAM provided in a server system connected to a private communication network or the Internet may be used as the recording medium and the programs may be provided to the computer 900 over the network.

The cache optimizing device 140 described above allows configuration of caches relating to Web applications and setting of policies, which have been difficult to optimize manually, to be performed efficiently. Furthermore, the cache optimizing device 140 according to the present embodiment allows the cache hit ratios in various types of cache devices 130 including LRU caches and priority LRU caches to be approximated and allows optimum parameters to be set efficiently according to the approximated cache hit ratios.

The following is the result of a comparison between an estimated cache hit ratio calculated with Equation (19) or (24) shown in the present embodiment and the cache hit ratio obtained by an event-driven simulation. In the comparison, a cache model including four groups each of which has 250 access target data was used. The cache size K was changed within the range from 100 to 1,000 in increments of 100 and evaluations are performed for the cases where only access requests are received, where both access requests and invalidate requests are received, where invalidations due to timeouts occur, and where caching priorities are considered. The result showed that the difference between the estimate cache hit rate obtained using Equation (19) or (24) and the cache hit ratio obtained by the event-driven simulation was 0.016 at the maximum. Therefore, it can be said that the cache optimizing device 140 according to the present embodiment can quickly obtain the cache hit ratio by using a functional calculus with an accuracy equivalent to that obtained by the event-driven simulation.

While the present invention has been described with respect to embodiments thereof, the technical scope of the present invention is not limited to that described with the embodiments. It will be apparent to those skilled in the art that various modifications or improvements can be made to the embodiment. It will be apparent from the Claims that embodiments to which such modifications and improvements are made also fall within the scope of the technical scope of the present invention.

For example, if a caching device 130 uses a policy that updates the cache when access target data are updated, the access processing performance estimation function in Equation (25) may be used, in place of the access processing performance estimation function in Equation (14).

[Equation 25]

$$C = \sum_{i=1}^{M} v_i \lambda_i (h_i C_i^r + (1-h_i)C_i^c) + v_i \mu_i C_i^u \quad (25)$$

In Equation (25), the average frequency of access target data updates is $\mu_i$, the update cost is $C_i^\mu$, and the cache hit ratio $h_i$ is the sum of the access requests and update requests.

The invention may be implemented, for example, by having the system for cache hit ratio estimating as a software application, a dedicated processor, or a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for cache hit ratio estimating as a software application in a relational database management system.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc.

Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable rows, script rows and wizards for installation, as in Zip rows and cab rows. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A cache hit ratio estimating apparatus including a computer comprising (1) a CPU section including a CPU, a RAM, a graphic controller, and display device interconnected through a host controller; (2) an input/output section including a communication interface, a hard disk drive and a CD-ROM drive, which are connected to the host controller through an input/output controller, and (3) a legacy input/output section including a ROM, a flexible-disk drive, and an input/output chip, which are connected to the input/output controller; said computer adapted for estimating the cache hit ratio of a caching device caching access target data accessed by a requesting device, wherein:

at least one of a plurality of access target data has a different cache miss access cost compared to any other data of said plurality of access target data, said apparatus comprising:

an access request arrival frequency obtaining section for obtaining an average arrival frequency by measuring access requests for each of said plurality of access target data;

an access request arrival probability density function generating section for generating an access request arrival probability density function which is a probability density function of the arrival time intervals of access requests for each of said plurality of access target data, on the basis of the average arrival frequency of access requests for said each of said plurality of access target data; and a cache hit ratio estimation function generating section for generating an estimation function of the cache hit ratio for each of said plurality of access target data, on the basis of said access request arrival probability density function for said plurality of access target data.

2. The cache hit ratio estimating apparatus according to claim 1, further comprising:

a parameter setting section for setting in said caching device a setting parameter that changes the access processing performance to respond to access requests by said requesting device;

an access processing performance estimation function generating section for generating an estimation function for said access processing performance, on the basis of said cache hit ratio estimation function and said cache miss access cost for each of said plurality of access target data; and a parameter changing section for changing the value of said setting parameter set in said caching device to a value that increases the estimated value of said access processing performance derived from said access processing performance estimation function.

3. The cache hit ratio estimating apparatus according to claim 2, wherein:

said cache hit ratio estimation function generating section and said access processing performance estimation function generating section generate said cache hit ratio estimation function and said access processing performance estimation function respectively, by using as an input a setting parameter for setting whether or not each of said plurality of access target data is to be cached; and, if the estimated value of said access processing performance in the case where one of said plurality of access target data is cached is higher than the estimated value of said access processing performance in the case where said one of said plurality of access target data is not cached, said parameter changing section sets in said caching device a value of said setting parameter that specifies to cache said one of said plurality of access target data.

4. The cache hit ratio estimating apparatus according to claim 2, wherein:

said cache hit ratio estimation function generating section and said access processing performance estimation function generating section generate said cache hit ratio estimation function and said access processing performance estimation function respectively, by using as an input the caching priority for each of said plurality of access target data; and if the estimated value of said access processing performance achieved by assigning a first caching priority to one of said plurality of access target data is higher than the estimated value of said access processing performance achieved by assigning a second caching priority to said one of said plurality of access target data, said parameter changing section sets in said caching device a value of said setting parameter that assigns said first caching priority to said one of said plurality of access target data.

5. The cache hit ratio estimating apparatus according to claim 2, wherein:

said caching device caches each of said plurality of access target data, in a predetermined cache partition associated with said each of said plurality of access target data among a plurality of cache partitions into which a cache memory area of said caching device is divided;

said cache hit ratio estimation function generating section and said access performance estimation function generating section generate said cache hit ratio estimation function and said access processing performance estimation function respectively, by using as an input a combination of the proportions of said plurality of cache partitions to said cache memory area; and if the estimated value of said access processing performance achieved by specifying a combination of the proportions of said plurality of cache partitions to said cache memory area as a first combination is higher than the estimated value of said access processing performance achieved by specifying said combination as a second combination, said parameter changing section sets in said caching device a value of said setting parameter that specifies said combination of the proportions of said plurality of cache partitions as said first combination.

6. The cache hit ratio estimating apparatus according to claim 2, wherein:

said caching device caches each of said plurality of access target data, in a predetermined cache partition associated with said each of said plurality of access target data among a plurality of cache partitions into which the cache memory area of said caching device is divided;

said cache hit ratio estimation function generating section and said access processing performance estimation function generating section generate said cache hit ratio estimation function and said access processing performance estimation function respectively, by using as an input a combination of handlings specifying which of said plurality of access target data should be cached in which of said cache partitions; and if the estimated value of said access processing performance achieved by specifying said handlings as a first combination is higher than the estimated value of said access processing performance achieved by specifying said handlings as a second combination, said parameter changing section sets in said caching device said setting parameter specifying said handlings as said first combination.

7. The cache hit ratio estimating apparatus according to claim 2, further comprising:

a next-access hit time distribution function generating section for generating, for each of said plurality of access target data, on the basis of said access request arrival probability density function, after the reception of said access request for said each of said plurality of access target data, a next-access hit time distribution function which is a time distribution of the probability that a next access request for said each of said plurality of access target data is received before said each of said plurality of access target data is invalidated in the cache; and a cache valid time distribution function generating section, for each of said plurality of access target data, on the basis of said access request arrival probability density, with respect to a predetermined base point of time, for receiving at least one access request for said each of said plurality of access target data and for generating a cache valid time distribution function which is a time distribution of the probability that said each of said plurality of access target data has not been invalidated in the cache;

wherein said cache hit ratio estimation function generating section generates said cache hit ratio estimation function, for each of said plurality of access target data, on the basis of said cache valid time distribution function of said plurality of access target data and said next-access hit time distribution function for said each of said plurality of access target data.

8. The cache hit ratio estimating apparatus according to claim 7, further comprising:

an invalidate request arrival probability density function generating section for generating, for each of said plurality of access target data, on the basis of the average arrival frequency of invalidate requests for said each of said plurality of access target data, an invalidate request arrival probability density function which is a probability density function of the arrival time intervals of invalidate requests;

wherein said next-access hit ratio time distribution function generating section and said cache valid time distribution function generating section generate said next-access hit time distribution function and said cache valid time distribution function respectively, on the basis of said invalidate request arrival probability density function.

9. The cache hit ratio estimating apparatus according to 8, wherein:

if said caching device receives an invalidate request for one of said plurality of access target data which is being cached, or if a predetermined time period has elapsed from the time of caching said one of said plurality of access target data without receiving an access request for said one of said plurality of access target data, said caching device invalidates in the cache said one of said plurality of access target data; and said next-access hit time distribution function generating section and said cache valid time distribution function generating section generate said next-access hit time distribution function and said cache valid time distribution function respectively, for each of a time segment before said predetermined time period has elapsed and a time segment after said predetermined time period has elapsed.

10. The cache hit ratio estimating apparatus according to claim 7, wherein:

said caching device caches up to K data of said plurality of access target data by using an LRU (Least Recently Used) principle; and said cache hit ratio estimation function generating section comprises:

an entry count expected value function generating section for generating, on the basis of said cache valid time distribution function of said plurality of access target data, an entry count expected value function for obtaining an expected value for the number of the access target data that are cached without being invalidated;

a cache fill time calculating section for calculating, on the basis of said entry count expected value function, with respect to a predetermined base point of time, an expected value of cache fill time taken for K data of said plurality of access target data to be cached; and a next-access hit ratio estimation function generating section for calculating, for each of said plurality of access target data, on the basis of said next-access hit time distribution function, a function of the probability that an access request for said each of said plurality of access target data is received in the period from the reception of an access request for said each of said plurality of access target data until the time determined by the expected value of said cache fill time, and for setting the calculated function as said cache hit ratio estimation function for said each of said plurality of access target data.

11. The cache hit ratio estimating apparatus according to claim 7, wherein:

for each of said plurality of access target data, a caching priority for caching said each of said plurality of access target data is assigned, and said caching device comprises:

a plurality of LRU lists, each of which being provided for each priority, for managing said cached access target data by using an LRU principle;

an entry displacing section for displacing said access target data for which an access request is received, to the top of one of said plurality of LRU lists that corresponds to the priority of said access target data; and an LRU list shifting section for shifting, if the lowest-priority LRU list is empty, the access target data assigned in each of said plurality of LRU lists to a lower-priority LRU list among said plurality of LRU lists; and said cache hit ratio estimation function generating section comprises:

an entry count expected value function generating section for generating, on the basis of said cache valid time distribution function of said plurality of access target data, an entry count expected value function for obtaining an expected value of the total number of said access target data assigned in said plurality of LRU lists;

a shift cycle period calculating section for calculating an expected value of said shift cycle period, on the basis of said entry count expected value function;

a replacing time calculating section for calculating an expected value of replacing time that elapses between the reception of an access request for one of said plurality of access target data and the replacement of said one of said plurality of access target data with another one of said plurality of access target data, at each point of time that equally divides said shift cycle period into several intervals;

a next-access hit ratio estimation function generating section for generating, for each of said plurality of access target data, on the basis of said next-access hit time distribution function and said replacing time, a next-access hit ratio estimation function for calculating, at each point of time that equally divides said shift cycle period into several intervals, the probability that an access request for said each of said plurality of access target data is received in a period from the reception of an access request for said each of access target data until the lapse of the time determined by an expected value of said replacing time; and a next-access hit ratio averaging section for calculating, for each of said plurality of access target data, the average of said next-access hit ratio estimation functions for access requests received at all said points of time that equally divide said shift cycle period into several intervals, and for setting said calculated average as said cache hit ratio estimation function for said each of said plurality of access target data.

12. The cache hit ratio estimating apparatus according to claim 2, wherein:

said plurality of access target data are generated by executing on a server device receiving said access requests a server program associated with said access requests, for a processing time specified by said access cost; and said caching device comprises a cache memory area for caching said plurality of access target data generated by said server device.

13. The cache hit ratio estimating apparatus according to claim 2, wherein:

each of said plurality of access target data belongs to any of a plurality of groups;

said cache hit ratio estimating apparatus comprises:

a group-based cache hit ratio obtaining section for obtaining, for each group of said plurality of groups, an average cache hit ratio measured for all the access target data belonging to said each group;

a group-based entry count obtaining section for obtaining, for each of said plurality of groups, a measured value of a group-based entry count which is the number of access target data currently being cached among all of the access target data belonging to said each group; and an access target data count calculating section for calculating, for each group of said plurality of groups, the estimated number of the access target data belonging to said each group, by dividing said group-based entry count of said each group by said average cache hit ratio of said each group;

and wherein:

said access request arrival frequency obtaining section obtains, for each group of said plurality of groups, the average arrival frequency of access requests for all the access target data belonging to said each group, by dividing the average arrival frequency of access requests measured for said all the access target data by the estimated number of the access target data belonging to said each group; and, said cache hit ratio estimation function generating section generates said cache hit ratio estimation function for the access target data belonging to each group of said plurality of groups, on the basis of the estimated number of the access target data belonging to said each group.

14. The cache hit ratio estimating apparatus according to claim 13, further comprising:

a function-for-integration generating section for generating said access processing performance estimation function, in the case where each group in each of a plurality of caching devices is integrated into the corresponding group in one of said plurality of caching devices; and a group integrating section for integrating said each group in each of said plurality of caching devices into the corresponding group in said one of said plurality of caching devices, if the estimated value of said access processing performance derived from said access processing performance estimation function generated by said function-for-integration generating section is higher than the sum of estimated values of the access processing performance of said plurality of caching devices.

15. The cache hit ratio estimating apparatus according to claim 13, further comprising:

a function-for-disintegration generating section for generating said access processing performance estimation function of each of a plurality of caching devices, in the case where each group in one of said plurality of caching devices is disintegrated into the corresponding group in each of said plurality of caching devices; and a group disintegrating section for disintegrating each group in said one of said plurality of caching devices into the corresponding group in each of said plurality of caching devices, if the sum of estimated values of said access processing performance derived from said access processing performance estimation function generated by said function-for-disintegration generating section is higher than the estimated value of said access processing performance of said one of said plurality of caching devices.

16. A cache hit ratio estimating method for estimating using a computer the cache hit ratio of a caching device caching access target data accessed by a requesting device, wherein:

at least one of a plurality of access target data has a different cache miss access cost compared to any other of said plurality of access target data, said method comprising:

an access request arrival frequency obtaining step of obtaining an average arrival frequency by measuring access requests for each of said plurality of access target data;

an access request arrival probability density function generating step of generating an access request arrival probability density function which is a probability density function of the arrival time intervals of access requests for each of said plurality of access target data, on the basis of the average arrival frequency of access requests for said each of said plurality of access target data; and a cache hit ratio estimation function generating step of generating an estimation function of the cache hit ratio for each of said plurality of access target data, on the basis of said access request arrival probability density function for said plurality of access target data.

17. The cache hit ratio estimating method according to claim 16, further comprising:

setting a setting parameter that changes the access processing performance to respond to access requests by said requesting device;

generating an estimation function for said access processing performance, on the basis of said cache hit ratio estimation function and said cache miss access cost for each of said plurality of access target data; and changing the value of said setting parameter to a value that increases the estimated value of said access processing performance.

18. The cache hit ratio estimating method according to claim 17, comprising:

generating said cache hit ratio estimation function and said access processing performance estimation function respectively, by using as an input a setting parameter for setting whether or not each of said plurality of access target data is to be cached; and, if the estimated value of said access processing performance in the case where one of said plurality of access target data is cached is higher than the estimated value of said access processing performance in the case where said one of said plurality of access target data is not cached, setting in said caching device a value of said setting parameter that specifies to cache said one of said plurality of access target data.

19. The cache hit ratio estimating method according to claim 18, comprising:

generating said cache hit ratio estimation function and said access processing performance estimation function respectively, by using as an input the caching priority for each of said plurality of access target data; and if the estimated value of said access processing performance achieved by assigning a first caching priority to one of said plurality of access target data is higher than the estimated value of said access processing performance achieved by assigning a second caching priority to said one of said plurality of access target data, said parameter changing section sets in said caching device a value of said setting parameter that assigns said first caching priority to said one of said plurality of access target data.

20. The cache hit ratio estimating method according to claim 18, wherein:
    caching each of said plurality of access target data, in a predetermined cache partition associated with said each of said plurality of access target data among a plurality of cache partitions into which a cache memory area of said caching device is divided;
    generating said cache hit ratio estimation function and said access processing performance estimation function respectively, by using as an input a combination of the proportions of said plurality of cache partitions to said cache memory area; and
    if the estimated value of said access processing performance achieved by specifying a combination of the proportions of said plurality of cache partitions to said cache memory area as a first combination is higher than the estimated value of said access processing performance achieved by specifying said combination as a second combination, said parameter changing section sets in said caching device a value of said setting parameter that specifies said combination of the proportions of said plurality of cache partitions as said first combination.

21. The cache hit ratio estimating method according to claim 18, wherein:
    caching each of said plurality of access target data, in a predetermined cache partition associated with said each of said plurality of access target data among a plurality of cache partitions into which the cache memory area of said caching device is divided;
    said cache hit ratio estimation function generating and said access processing performance estimation function generating section generate said cache hit ratio estimation function and said access processing performance estimation function respectively, by using as an input a combination of handlings specifying which of said plurality of access target data should be cached in which of said cache partitions; and
    if the estimated value of said access processing performance achieved by specifying said handlings as a first combination is higher than the estimated value of said access processing performance achieved by specifying said handlings as a second combination, said parameter changing section sets in said caching device said setting parameter specifying said handlings as said first combination.

22. The cache hit ratio estimating method according to claim 18, further comprising:
    a next-access hit time distribution function generating, for each of said plurality of access target data, on the basis of said access request arrival probability density function, after the reception of said access request for said each of said plurality of access target data, a next-access hit time distribution function which is a time distribution of the probability that a next access request for said each of said plurality of access target data is received before said each of said plurality of access target data is invalidated in the cache; and
    a cache valid time distribution function generating, for each of said plurality of access target data, on the basis of said access request arrival probability density, with respect to a predetermined base point of time, for receiving at least one access request for said each of said plurality of access target data and for generating a cache valid time distribution function which is a time distribution of the probability that said each of said plurality of access target data has not been invalidated in the cache;
    wherein said cache hit ratio estimation function generates said cache hit ratio estimation function, for each of said plurality of access target data, on the basis of said cache valid time distribution function of said plurality of access target data and said next-access hit time distribution function for said each of said plurality of access target data.

23. The cache hit ratio estimating method according to claim 22, further comprising:
    an invalidate request arrival probability density function for generating, for each of said plurality of access target data, on the basis of the average arrival frequency of invalidate requests for said each of said plurality of access target data, an invalidate request arrival probability density function which is a probability density function of the arrival time intervals of invalidate requests;
    wherein said next-access hit ratio time distribution function generating function and said cache valid time distribution generating function generate said next-access hit time distribution function and said cache valid time distribution function respectively, on the basis of said invalidate request arrival probability density function.

24. The cache hit ratio estimating method according to 22, wherein:
    if said caching device receives an invalidate request for one of said plurality of access target data which is being cached, or if a predetermined time period has elapsed from the time of caching said one of said plurality of access target data without receiving an access request for said one of said plurality of access target data, invalidating in the cache said one of said plurality of access target data; and
    said next-access hit time distribution generating function and said cache valid time distribution generating section generate said next-access hit time distribution function and said cache valid time distribution function respectively, for each of a time segment before said predetermined time period has elapsed and a time segment after said predetermined time period has elapsed.

25. The cache hit ratio estimating method according to claim 22, wherein:
    said caching device caches up to K data of said plurality of access target data by using an LRU (Least Recently Used) principle; and
    said cache hit ratio estimation function section comprises:
    an entry count expected value function generating section for generating, on the basis of said cache valid time distribution function of said plurality of access target data, an entry count expected value function for obtaining an expected value for the number of the access target data that are cached without being invalidated;
    a cache fill time calculating section for calculating, on the basis of said entry count expected value function, with respect to a predetermined base point of time, an expected value of cache fill time taken for K data of said plurality of access target data to be cached; and
    a next-access hit ratio estimation function generating section for calculating, for each of said plurality of access target data, on the basis of said next-access hit time distribution function, a function of the probability that an access request for said each of said plurality of access target data is received in the period from the reception of an access request for said each of said plurality of access target data until the time determined by the expected value of said cache fill time, and for setting the calculated function as said cache hit ratio estimation function for said each of said plurality of access target data.

26. The cache hit ratio estimating method according to claim 22, wherein:

for each of said plurality of access target data, a caching priority for caching said each of said plurality of access target data is assigned, and said caching device comprises:

a plurality of LRU lists, each of which being provided for each priority, for managing said cached access target data by using an LRU principle;

an entry displacing section for displacing said access target data for which an access request is received, to the top of one of said plurality of LRU lists that corresponds to the priority of said access target data; and an LRU list shifting section for shifting, if the lowest-priority LRU list is empty, the access target data assigned in each of said plurality of LRU lists to a lower-priority LRU list among said plurality of LRU lists; and said cache hit ratio estimation function generating section comprises:

an entry count expected value function generating section for generating, on the basis of said cache valid time distribution function of said plurality of access target data, an entry count expected value function for obtaining an expected value of the total number of said access target data assigned in said plurality of LRU lists;

a shift cycle period calculating section for calculating an expected value of said shift cycle period, on the basis of said entry count expected value function;

a replacing time calculating section for calculating an expected value of replacing time that elapses between the reception of an access request for one of said plurality of access target data and the replacement of said one of said plurality of access target data with another one of said plurality of access target data, at each point of time that equally divides said shift cycle period into several intervals;

a next-access hit ratio estimation function generating section for generating, for each of said plurality of access target data, on the basis of said next-access hit time distribution function and said replacing time, a next-access hit ratio estimation function for calculating, at each point of time that equally divides said shift cycle period into several intervals, the probability that an access request for said each of said plurality of access target data is received in a period from the reception of an access request for said each of access target data until the lapse of the time determined by an expected value of said replacing time; and a next-access hit ratio averaging section for calculating, for each of said plurality of access target data, the average of said next-access hit ratio estimation functions for access requests received at all said points of time that equally divide said shift cycle period into several intervals, and for setting said calculated average as said cache hit ratio estimation function for said each of said plurality of access target data.

27. The cache hit ratio estimating method according to claim 17, wherein:

said plurality of access target data are generated by executing on a server device receiving said access requests a server program associated with said access requests, for a processing time specified by said access cost; and said caching device comprises a cache memory area for caching said plurality of access target data generated by said server device.

28. The cache hit ratio estimating method according to claim 27, further comprising:

generating said access processing performance estimation function, in the case where each group in each of a plurality of caching devices is integrated into the corresponding group in one of said plurality of caching devices; and integrating said each group in each of said plurality of caching devices into the corresponding group in said one of said plurality of caching devices, if the estimated value of said access processing performance derived from said access processing performance estimation function generated by said function-for-integration generating section is higher than the sum of estimated values of the access processing performance of said plurality of caching devices.

29. The cache hit ratio estimating method according to claim 27, further comprising:

generating said access processing performance estimation function of each of a plurality of caching devices, in the case where each group in one of said plurality of caching devices is disintegrated into the corresponding group in each of said plurality of caching devices; and disintegrating each group in said one of said plurality of caching devices into the corresponding group in each of said plurality of caching devices, if the sum of estimated values of said access processing performance derived from said access processing performance estimation function generated by said function-for-disintegration generating section is higher than the estimated value of said access processing performance of said one of said plurality of caching devices.

30. The cache hit ratio estimating method according to claim 17, wherein:

each of said plurality of access target data belongs to any of a plurality of groups;

said cache hit ratio estimating apparatus comprises:

a group-based cache hit ratio obtaining section for obtaining, for each group of said plurality of groups, an average cache hit ratio measured for all the access target data belonging to said each group;

a group-based entry count obtaining section for obtaining, for each of said plurality of groups, a measured value of a group-based entry count which is the number of access target data currently being cached among all of the access target data belonging to said each group; and an access target data count calculating section for calculating, for each group of said plurality of groups, the estimated number of the access target data belonging to said each group, by dividing said group-based entry count of said each group by said average cache hit ratio of said each group;

and wherein:

said access request arrival frequency obtaining section obtains, for each group of said plurality of groups, the average arrival frequency of access requests for all the access target data belonging to said each group, by dividing the average arrival frequency of access requests measured for said all the access target data by the estimated number of the access target data belonging to said each group; and, said cache hit ratio estimation function generating section generates said cache hit ratio estimation function for the access target data belonging to each group of said plurality of groups, on the basis of the estimated number of the access target data belonging to said each group.

31. A computer-readable recording medium chosen from the group consisting of flexible disks, CD-ROMs, optical recording media, magneto-optical recording media, tape media, and semiconductor memories, said recording medium containing thereon computer readable program code for cache hit ratio estimating apparatus for estimating the cache hit ratio of a caching device caching access target data accessed by a requesting device, wherein:

at least one of a plurality of access target data has a different cache miss access cost compared to any other data of said plurality of access target data, said program causing said cache hit ratio estimating apparatus to function as:

an access request arrival frequency obtaining section for obtaining an average arrival frequency by measuring access requests for each of said plurality of access target data;

an access request arrival probability density function generating section for generating an access request arrival probability density function which is a probability density function of the arrival time intervals of access requests for each of said plurality of access target data, on the basis of the average arrival frequency of access requests for said each of said plurality of access target data; and a cache hit ratio estimation function generating section for generating an estimation function of the cache hit ratio for each of said plurality of access target data, on the basis of said access request arrival probability density function for said plurality of access target data.

* * * * *